(12) United States Patent
Sin Xicola et al.

(10) Patent No.: US 11,614,137 B2
(45) Date of Patent: Mar. 28, 2023

(54) COATINGS FOR BRAKE DISCS, METHOD FOR REDUCING WEAR AND ASSOCIATED BRAKE DISC

(71) Applicant: ITT Italia S.R.L., Milan (IT)

(72) Inventors: Agustin Sin Xicola, Milan (IT); Francesco Vannucci, Milan (IT); Simone Ansaloni, Milan (IT)

(73) Assignee: ITT Italia S.R.L., Milan (IT)

( * ) Notice: Subject to any disclaimer, the term of this patent is extended or adjusted under 35 U.S.C. 154(b) by 176 days.

(21) Appl. No.: 17/128,259

(22) Filed: Dec. 21, 2020

(65) Prior Publication Data

US 2022/0196098 A1 Jun. 23, 2022

(51) Int. Cl.
*F16D 65/12* (2006.01)
*F16D 69/02* (2006.01)
(Continued)

(52) U.S. Cl.
CPC ............ *F16D 69/027* (2013.01); *B60T 1/065* (2013.01); *B60T 1/067* (2013.01); *F16D 55/22* (2013.01); *F16D 65/092* (2013.01); *F16D 65/125* (2013.01); *F16D 65/127* (2013.01); *F16D 2065/1304* (2013.01); *F16D 2200/0013* (2013.01); *F16D 2200/0017* (2013.01);
(Continued)

(58) Field of Classification Search
CPC ......... F16D 65/092; F16D 65/125–128; F16D 69/027; F16D 2065/1304; F16D 2200/0013; F16D 2200/0017; F16D 2200/0021; F16D 2200/0065; F16D 2250/0046

USPC .......................................... 188/18 A, 218 XL
See application file for complete search history.

(56) References Cited

U.S. PATENT DOCUMENTS

| | | | |
|---|---|---|---|
| 4,290,510 A | 9/1981 | Warren | |
| 5,612,110 A * | 3/1997 | Watremez | F16D 69/027 428/614 |

(Continued)

FOREIGN PATENT DOCUMENTS

| CN | 111043203 A | 4/2020 |
|---|---|---|
| CN | 114763816 A | 7/2022 |

(Continued)

OTHER PUBLICATIONS

European Search Report App. No. EP20216490.1 dated May 18, 2021, p. 8.

(Continued)

*Primary Examiner* — Christopher P Schwartz
(74) *Attorney, Agent, or Firm* — Mannava & Kang, P.C.

(57) ABSTRACT

Brake pads are prepared using a LS (Low Steel) or NAO (Non-Asbestos Organics) type friction material formulation and at least one friction surface of a brake disc intended to cooperate in use with a brake pad that is coated with an anti-wear and anti-corrosion coating with adequate plasticity in order to have a reduced propensity to form micro-cracks under conditions of tribo-mechanical stress, chosen from the amongst the group consisting in: particles of chromium carbide ($Cr_3C_2$) dispersed within a metallic matrix consisting of an alloy of NiCr; particles of a combination of several metallic materials in order to create a metallic compound consisting of an alloy of FeNiCrMoSiC (iron-nickel-chromium-molybdenum-silicon-carbon).

13 Claims, 31 Drawing Sheets

(51) Int. Cl.
*B60T 1/06* (2006.01)
*F16D 55/22* (2006.01)
*F16D 65/092* (2006.01)
*F16D 65/02* (2006.01)

(52) U.S. Cl.
CPC ............ *F16D 2200/0021* (2013.01); *F16D 2250/0046* (2013.01)

(56) References Cited

U.S. PATENT DOCUMENTS

| | | | |
|---|---|---|---|
| 5,863,618 A * | 1/1999 | Jarosinski | C22C 1/1042 427/451 |
| 9,970,501 B2 * | 5/2018 | Hattori | F16D 69/026 |
| 10,399,144 B2 * | 9/2019 | Cook, III | E21B 31/20 |
| 2011/0042145 A1 | 2/2011 | Xia et al. | |
| 2011/0254230 A1 | 10/2011 | Jarosinski et al. | |
| 2011/0278116 A1 | 11/2011 | Lembach et al. | |
| 2015/0354647 A1 * | 12/2015 | Tironi | F16D 65/125 427/451 |
| 2017/0122392 A1 * | 5/2017 | Lembach | F16D 69/04 |
| 2020/0072307 A1 * | 3/2020 | Rettig | C23C 28/021 |
| 2020/0217382 A1 * | 7/2020 | Kuckert | F16D 65/127 |
| 2020/0378459 A1 * | 12/2020 | Carminati | F16D 65/125 |
| 2021/0293292 A1 * | 9/2021 | Rettig | F16D 65/127 |
| 2022/0065313 A1 * | 3/2022 | Carminati | F16D 65/127 |
| 2022/0196092 A1 * | 6/2022 | Sin Xicola | F16D 65/0025 |
| 2022/0196098 A1 | 6/2022 | Xicola et al. | |

FOREIGN PATENT DOCUMENTS

| | | | |
|---|---|---|---|
| CN | 114836707 A | 8/2022 | |
| DE | 102009050025 A1 * | 5/2011 | F16D 65/12 |
| DE | 102011056307 A1 | 6/2013 | |
| DE | 102014015474 A1 | 4/2016 | |
| DE | 102016200951 A1 | 7/2017 | |
| EP | 0960954 A2 | 12/1999 | |
| EP | 1258647 A2 | 11/2002 | |
| EP | 3620546 A2 | 3/2020 | |
| EP | 3620546 A3 | 4/2020 | |
| EP | 4019659 A1 | 6/2022 | |
| EP | 4019797 A1 | 6/2022 | |
| WO | 2017046681 A1 | 3/2017 | |
| WO | 2019020390 A1 | 1/2019 | |
| WO | 2019021161 A1 | 1/2019 | |
| WO | 2020128740 A1 | 6/2020 | |

OTHER PUBLICATIONS

Federici Matteo et al: "Pin-on-disc study of a friction material dry sliding against HVOF coated discs at room temperature and 300° C.", Tribology International, Elsevier Ltd, Amsterdam, NL, vol. 115, May 22, 2017 (May 22, 2017), pp. 89-99.

Federici Matteo et al: "Sliding Behaviour of Friction Material Against Cermet Coatings: Pin-on-Disc Study of the Running-in Stage", Tribology Letters, Baltzer Science Publishers, NL, vol. 66, No. 2, Feb. 22, 2018 (Feb. 22, 2018), pp. 1-11.

Search Report and Written Opinion for Application No. IT201900012171 dated May 4, 2020, p. 12.

Azad A et al: Influence of HVOF parameters on the wear resistance of Cr3C2-NiCr coating Wear and corrosion performance View project11 , Journal of Materials Science & Surface Engineering, Jan. 1, 2016 (Jan. 1, 2016), pp. 355-359.

European Search Report App. No. EP20216486.9 dated May 19, 2021, p. 8.

* cited by examiner

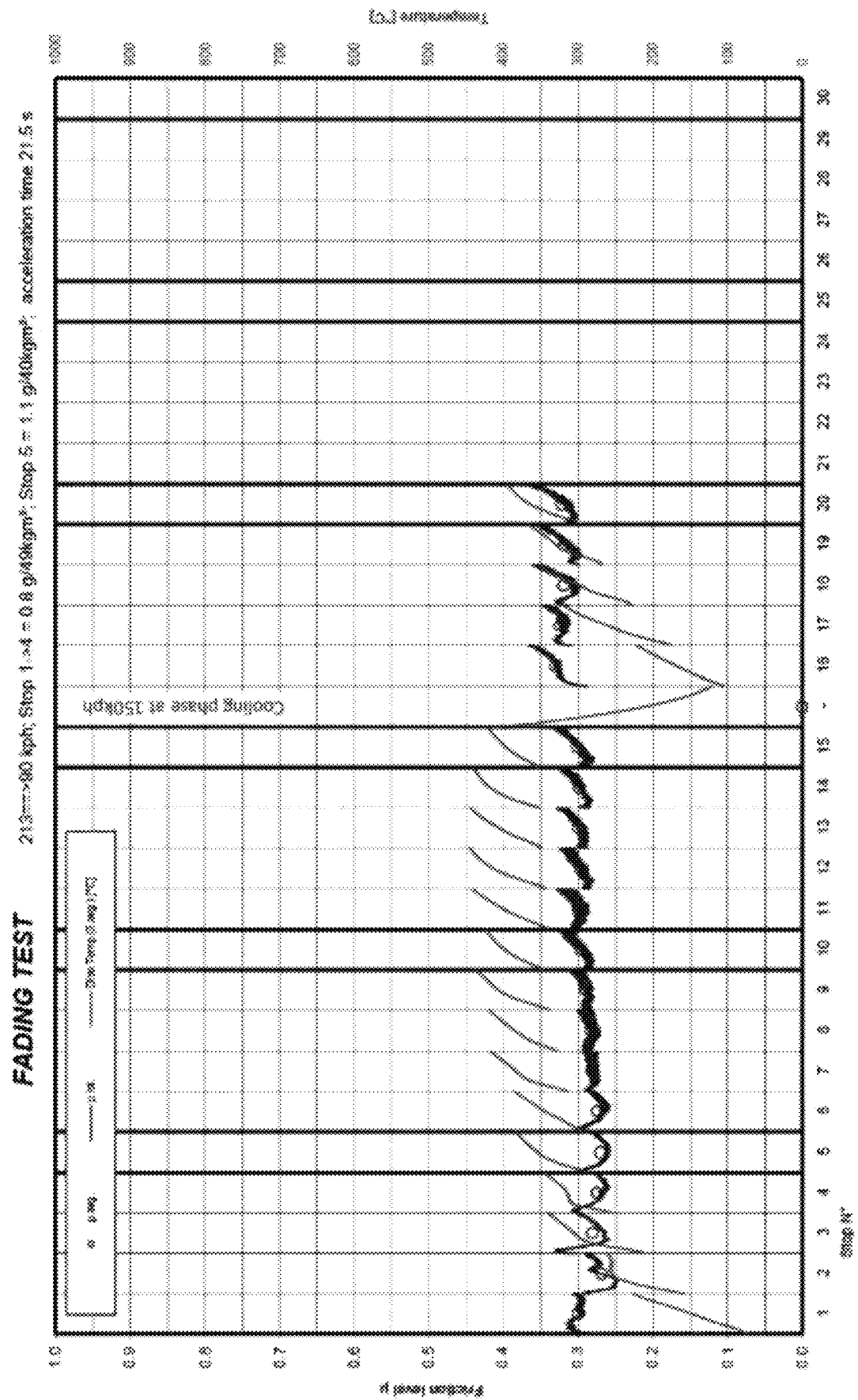

FIG. 6

COMPARISON

| Temperature | Conductivity (W/m·K) | | |
|---|---|---|---|
| | Cast Iron | Disc A0 | Disc A |
| 100°C | 83.27 | 89.599 | 86.155 |
| 150°C | 79.524 | 85.127 | 81.665 |
| 200°C | 75.493 | 80.896 | 77.829 |
| 250°C | 72.596 | 77.622 | 75.114 |

Cast Iron Rotor

Cr₂C₃ – NiCr Layer $Cr_2C_3$ — NiCr Layer

FeNiCrMoSiC Layer

COATINGS FOR BRAKE DISCS, METHOD FOR REDUCING WEAR AND ASSOCIATED BRAKE DISC

TECHNICAL FIELD

The present disclosure generally relates to coatings for the covering of brake discs, as well as to a method for reducing the wear of brake discs and of associated brake pads, and the method making use of such coatings. The disclosure additionally generally relates to an associated brake disc, wherein a friction surface thereof is provided with the coatings according to the disclosure.

SUMMARY

It is described anti-wear and anti-corrosion coating for a brake disc, which is applicable to at least one friction surface of the brake disc configured to cooperate in use with a braking element such as a brake pad, the anti-wear and anti-corrosion coating being adapted to be applied by means of thermal spray; wherein the anti-wear and anti-corrosion coating consists in a single layer made of a material selected in the group consisting in: particles of chromium carbide (Cr3C2) dispersed within a metallic matrix consisting of an alloy of NiCr; a metallic matrix constituted by a chromium-nickel austenitic steel and preferably composed of an alloy of FeNiCrMoSiC (iron-nickel-chromium-molybdenum-silicon-carbon), e.g. Diamalloy®; mixtures thereof in variable proportions; said anti-wear coating having plasticity such as to have a reduced propensity to form micro-cracks under conditions of tribo-mechanical stress.

It is also described an anti-wear and anti-corrosion coating as referred to above, wherein said particles of chromium carbide or the austenitic steel alloy preferably of composition FeNiCrMoSiC still in form of metallic particle of the single alloy components are applied by thermal spray by means of HVOF technology.

It is also described an anti-wear and anti-corrosion coating as referred to above, having a thickness of between 20 and 400 micrometers.

It is also described an anti-wear and anti-corrosion coating as referred to above having, after thermal spray coating and grinding, a surface roughness between 0.05 and 2 micrometers and preferably comprised between 0.15 and 0.3 micrometers.

It is also described a vehicle brake disc including at least one friction surface intended to cooperate in use with a braking element such as a brake pad, wherein at least said friction surface is covered with an anti-wear and anti-corrosion coating as disclosed above.

It is also described a method for the simultaneous reduction in wear of a brake disc and associated brake pads, comprising the steps of:
 preparing brake pads using an LS (Low Steel) or NAO (Non Asbestos Organics) type friction material formulation;
 covering at least one friction surface of a brake disc intended to cooperate in use with a brake pad with an anti-wear and anti-corrosion coating having plasticity such as to have a reduced propensity to form micro-cracks under conditions of tribo-mechanical stress, the coating comprising particles of chromium carbide (Cr3C2) dispersed within a metallic matrix consisting of an alloy of NiCr or a chromium-nickel austenitic steel and preferably consisting in an alloy of FeNiCrMoSiC (iron-nickel-chromium-molybdenum-silicon-carbon), e.g. Diamalloy®;
 coupling together the previously prepared brake pads and the brake disc.

In the method above the anti-wear coatings are applied by means of the HVOF (High Velocity Oxygen Fuel) thermal spray technology.

In the method above, the brake pads, which are made with a friction material belonging to the copper-free family, in particular of the LS (Low Steel) or NAO (Non-Asbestos Organics) type, are coupled together with an anti-wear coating coated on at least one friction surface of the brake disc consisting of particles of chromium carbide (Cr3C2) dispersed within a metallic matrix made of an alloy of NiCr, or of a chromium-nickel austenitic steel and preferably obtained from a combination of several metallic materials in order to create a compound constituted by an alloy of FeNiCrMoSiC (iron-nickel-chromium-molybdenum-silicon-carbon), e.g. Diamalloy®.

It is also described the use of friction materials belonging to the Copper Free families of the LS (Low Steel) type or of the NAO (Non-Asbestos Organics) type for the manufacture of brake pads in combination with the use of anti-wear and anti-corrosion coatings with plasticity such as to have a reduced propensity to form micro-cracks under conditions of tribo-mechanical stress on at least one friction surface of brake discs associated in operation with said brake pads in order to simultaneously reduce the wear of the brake pads and of the brake discs, said anti-wear and anti-corrosion coating being composed by a selected combination of particles of chromium carbide (Cr3C2) dispersed within a metallic matrix made of an alloy of NiCr or by a chromium-nickel austenitic steel and preferably obtained from a combination of several metallic materials in order to create a compound constituted by an alloy of FeNiCrMoSiC (iron-nickel-chromium-molybdenum-silicon-carbon), e.g. Diamalloy® and applied by means of an HVOF (High Velocity Oxygen Fuel) hot spray technique.

It is also described a braking system comprising an element to be braked consisting of a brake disc or drum made of cast iron or steel and at least one braking element composed of a brake shoe or pad, suitable for cooperating by friction with the element to be braked, characterized in that, in combination:
 the element to be braked has at least one friction surface configured to cooperate with the braking element, which friction surface is covered with an anti-wear and anti-corrosion coating as described above;
 the braking element comprises at least one friction material block configured to cooperate with the element to be braked, the friction material being of the LS (Low Steel) or NAO (Non Asbestos Organics) type.

BRIEF DESCRIPTION OF THE FIGURES

Further characteristics and advantages will become clear from the following description of its exemplary non-limiting embodiments given purely by way of example and with reference to the figures of attached drawings, in which:

FIG. 6 compares the thermal conductivity of the brake discs;

DETAILED DESCRIPTION

Figure 1B:
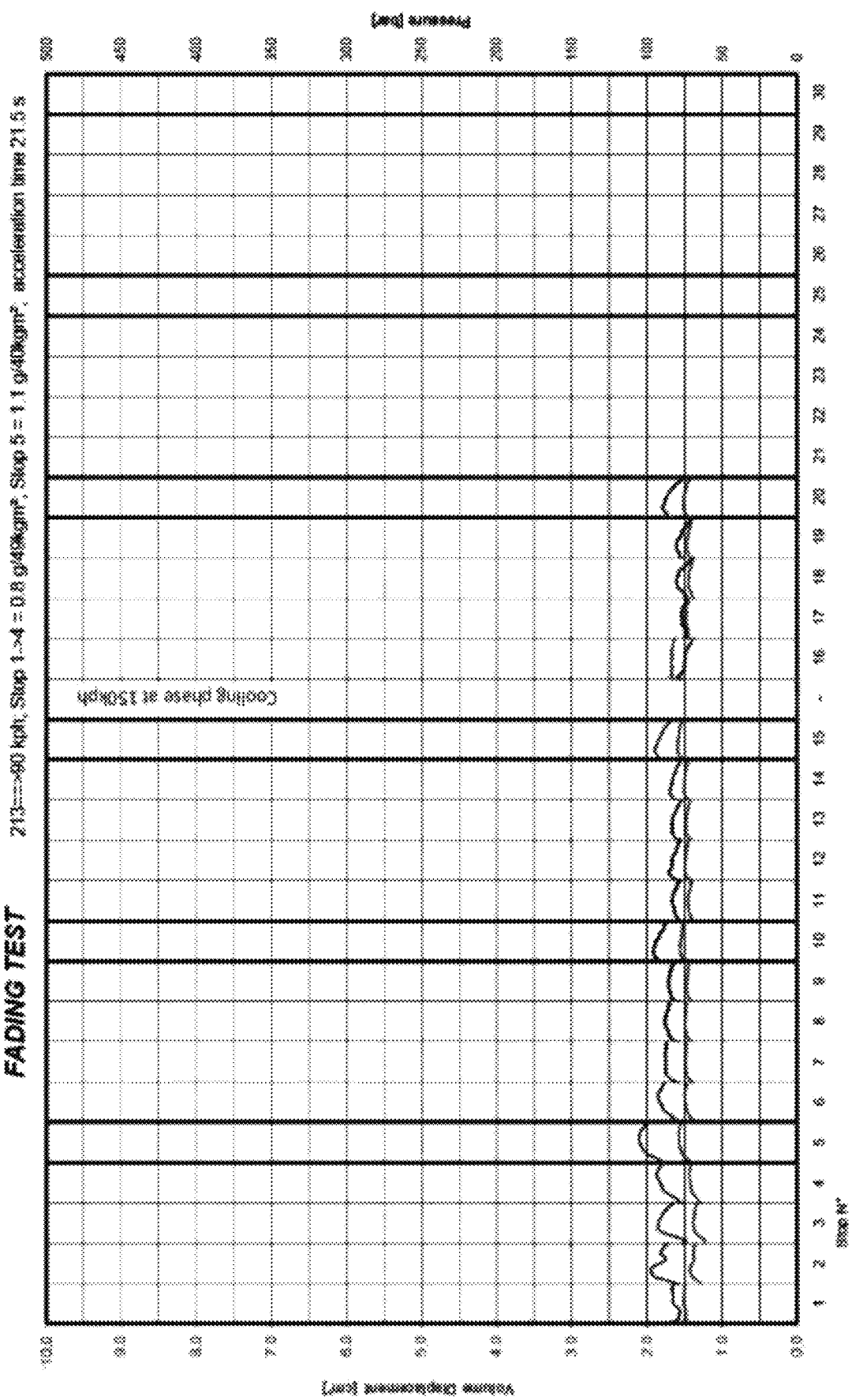
FIG. 1 shows graphs (Fade, oil consumption, friction coefficient progression) obtainable after a standard Fading test performed on a commercial brake disc made of cast iron, labelled as "Cast Iron", using brake pads made with an LS (Low Steel) type compound.
Figure 2A:
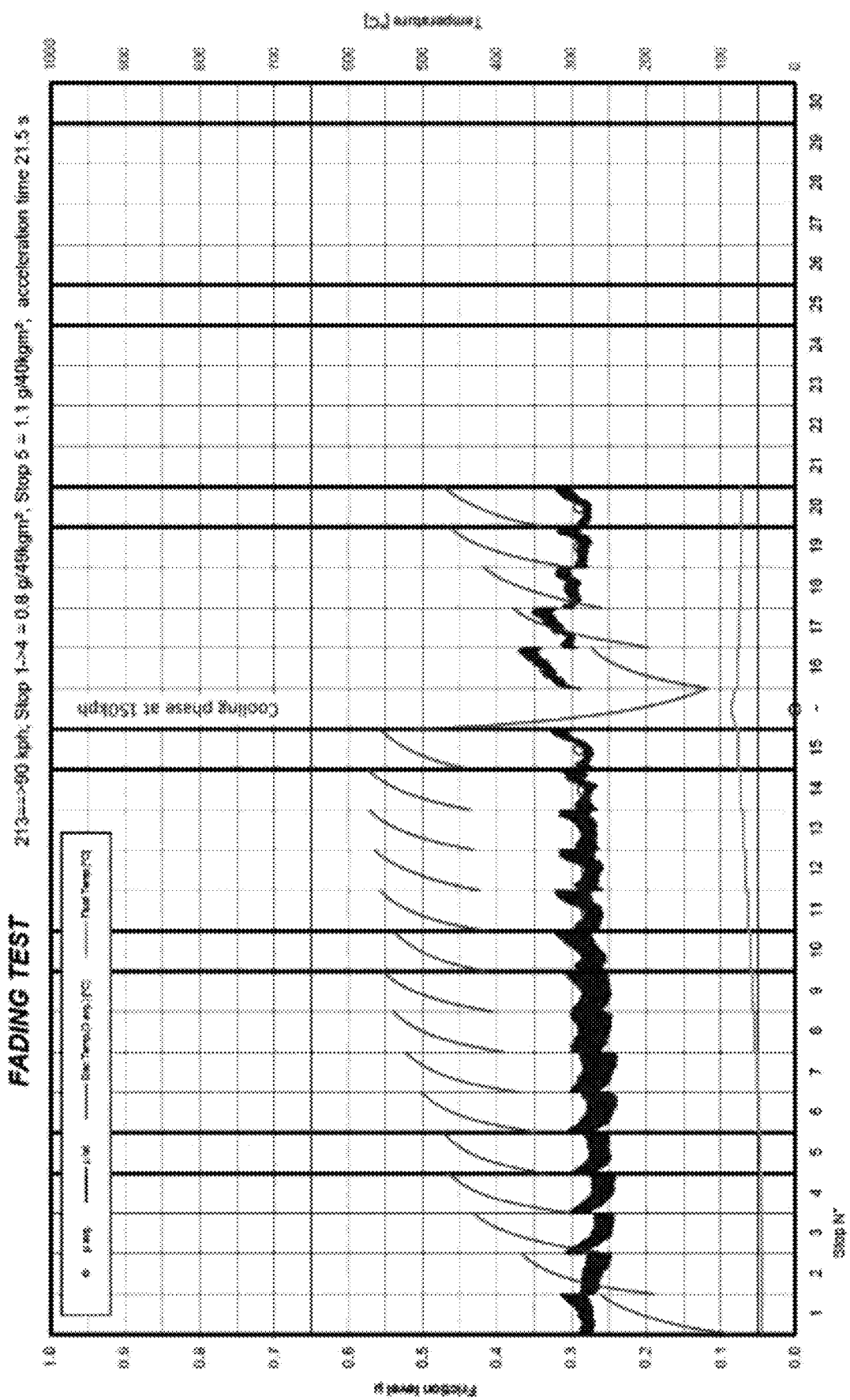
FIG. 2 shows the same graphs as FIG. 1 obtainable after a standard Fading test performed on the same commercial brake disc made of cast iron of FIG. 1, but covered with a WC coating (tungsten carbide) deposited on a bed of nickel, currently on the market and used for comparative purposes, labelled as "Disc A0", using brake pads made with a compound of the LS (Low Steel) type.
Figure 2B:
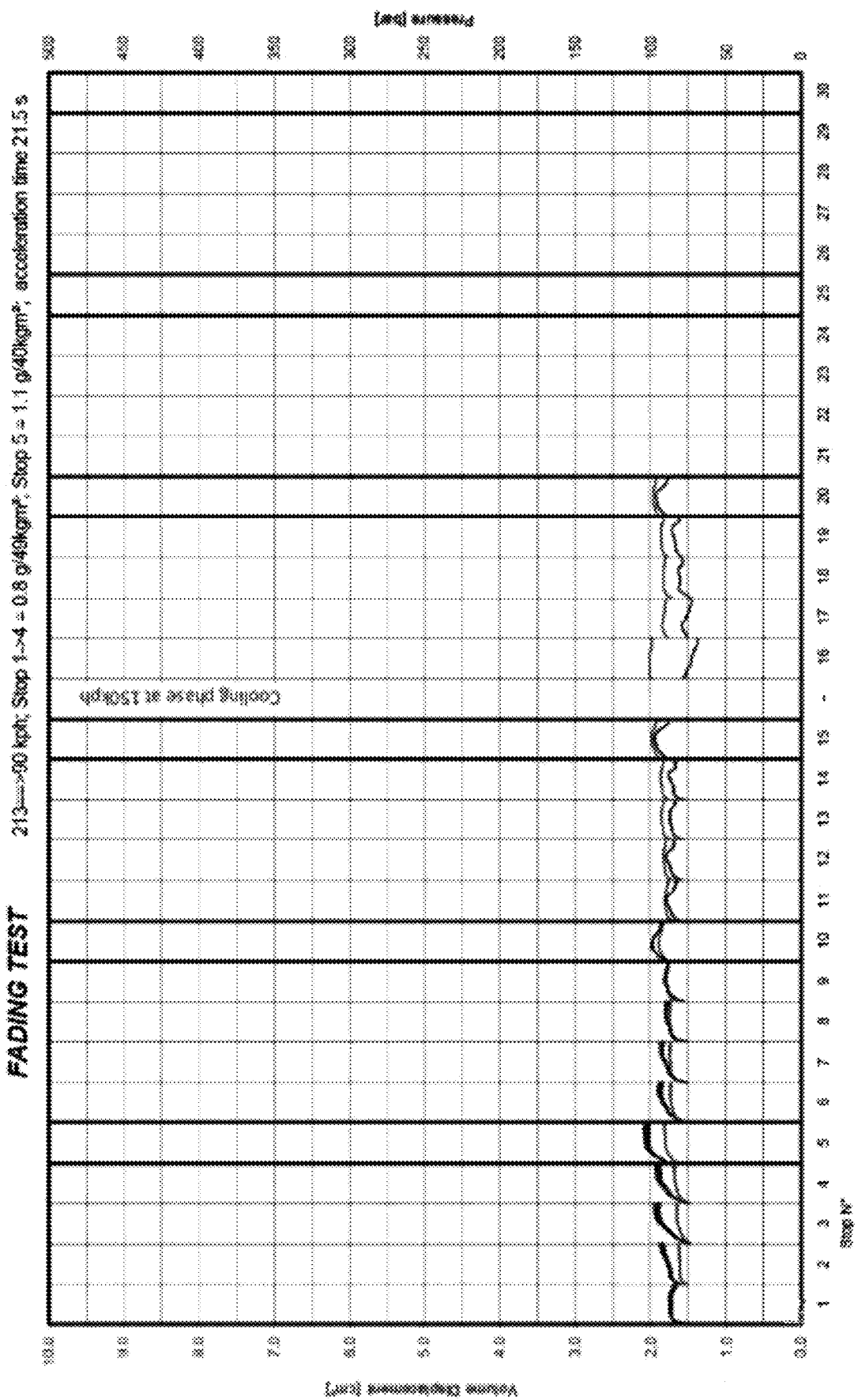
Figure 3A:
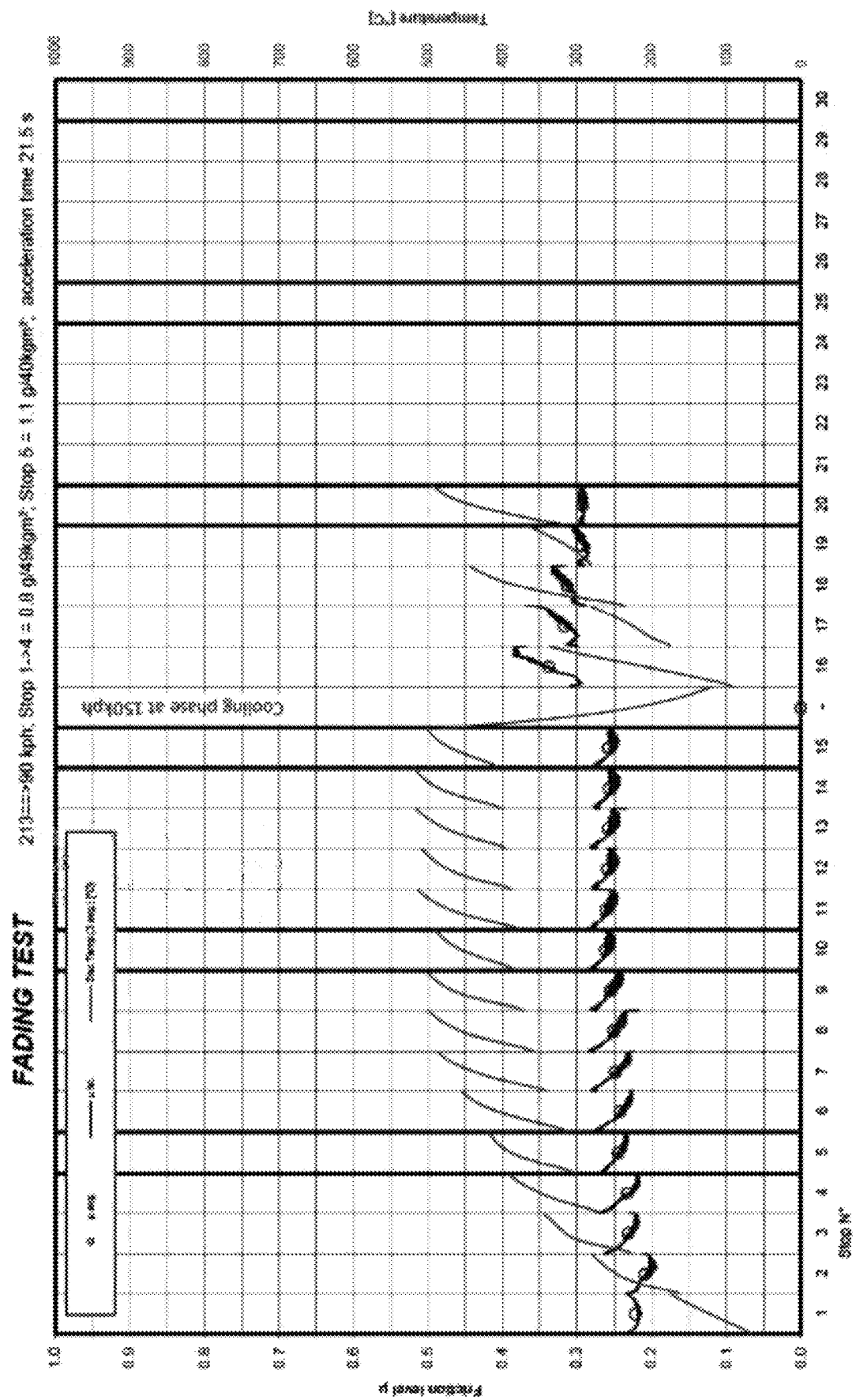
FIG. 3 shows the same graphs as FIG. 1 obtainable after a standard Fading test performed on the same commercial brake disc made of cast iron of FIG. 1, but covered with the anti-wear, anti-corrosion coating with plasticity such as to have a reduced propensity to form micro-cracks produced according to the disclosure composed of particles of chromium carbide ($Cr_3C_2$) dispersed within a metallic matrix can of an alloy of NiCr, labelled as "Disc A" using brake pads made with a compound of the LS (Low Steel) type.
Figure 3B:
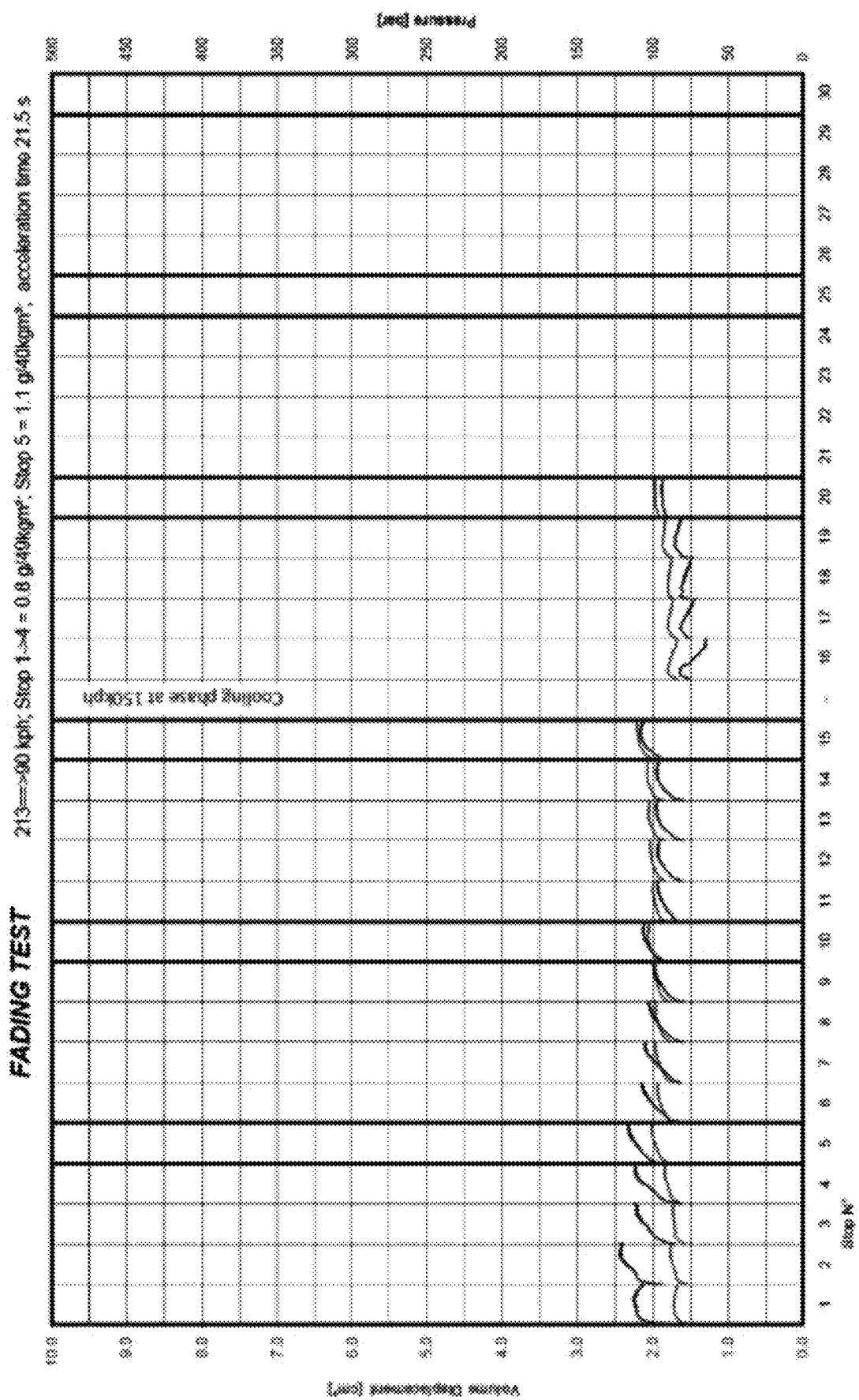
Figure 4A:
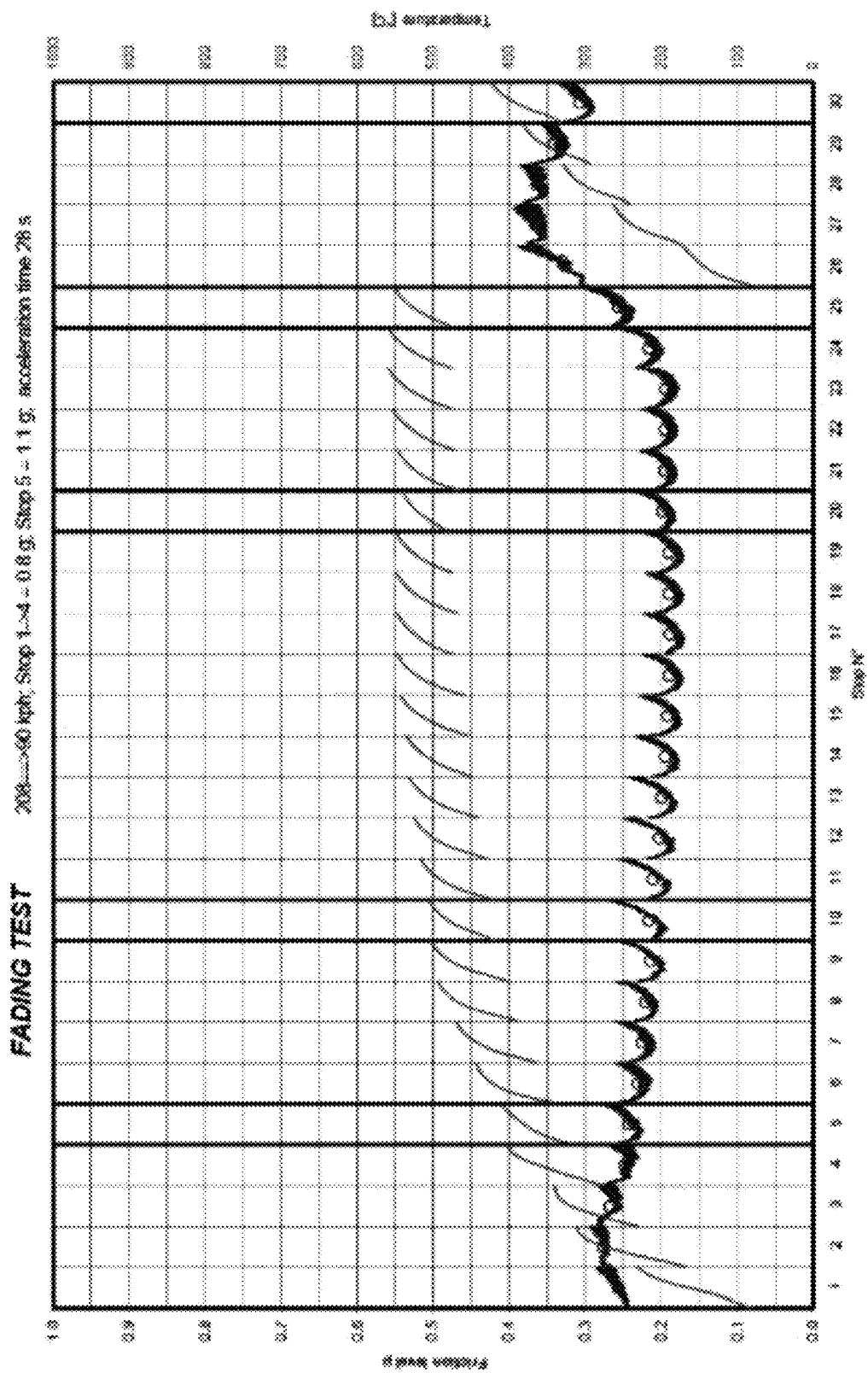
FIG. 4 shows an extract from the graphs (Fade, oil consumption, friction coefficient progression) obtainable after a standard Fading test, as in FIG. 1, performed on a commercial brake disc made of cast iron, but covered with the WC coating deposited on a bed of nickel, currently on the market and used for comparative purposes, labelled as "Disc A0", using brake pads made with a compound of the NAO (Non-Asbestos Organics) type.
Figure 4B:
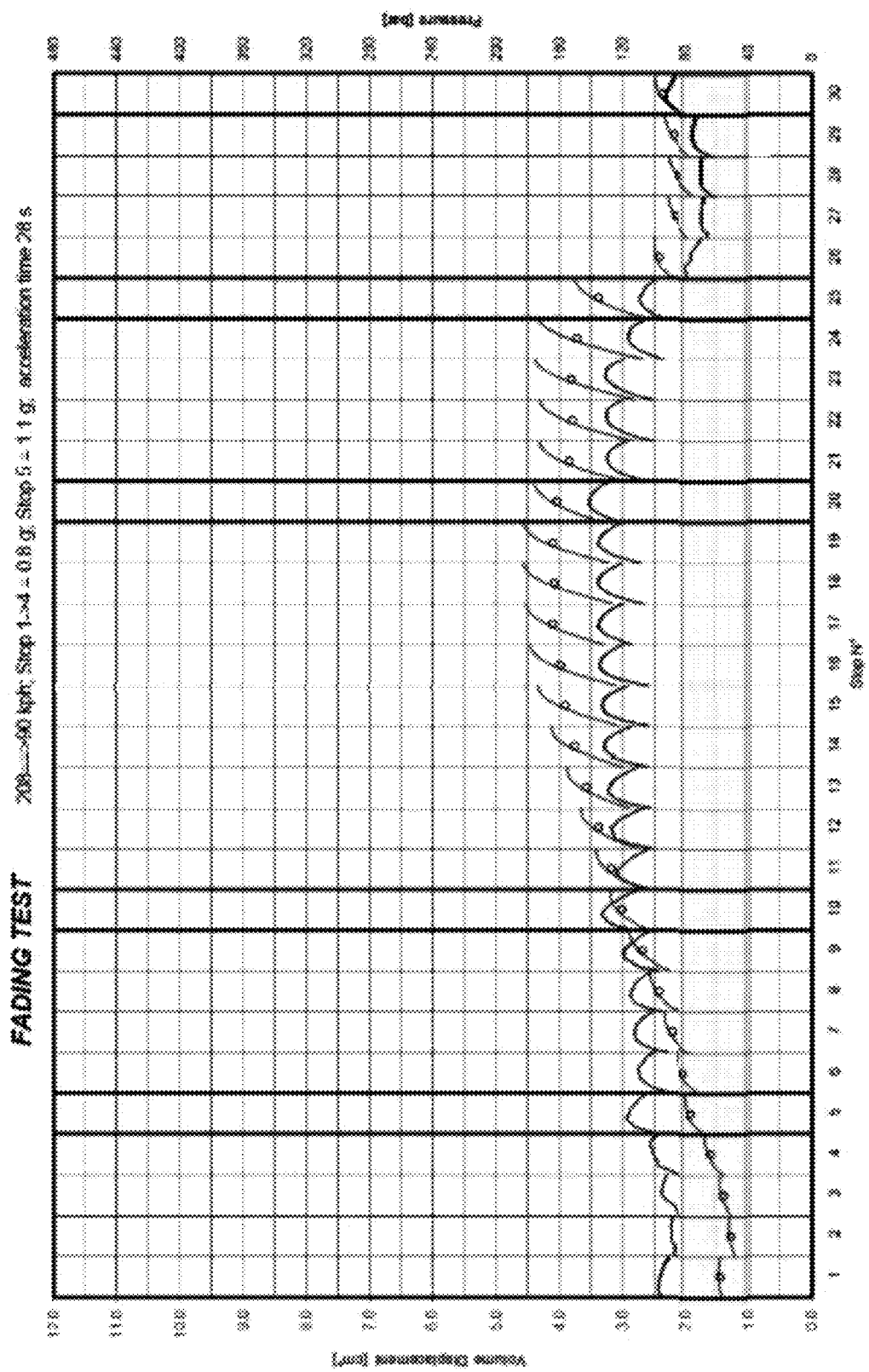
Figure 5A:
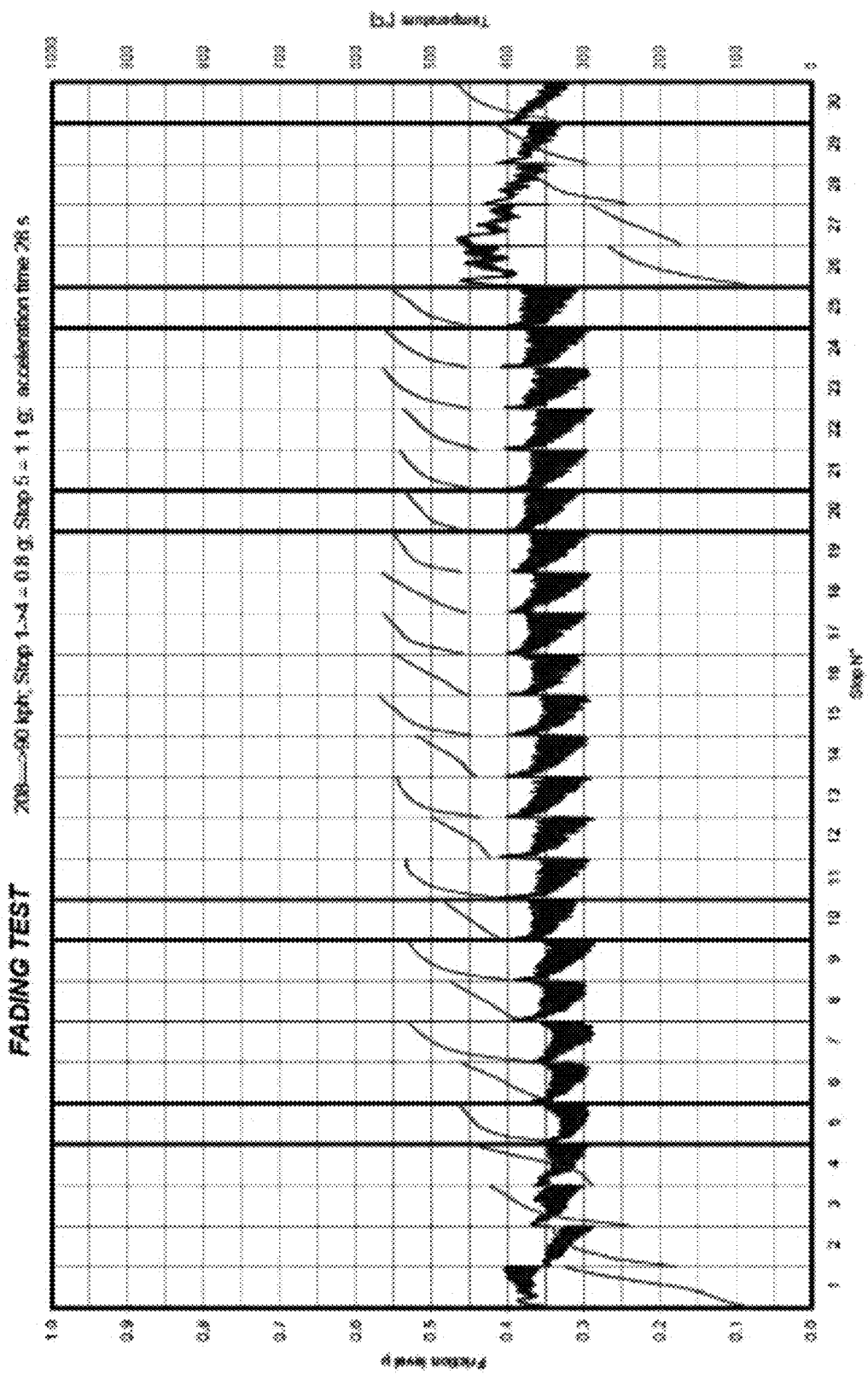
FIG. 5 shows the same graphs as FIG. 1 obtainable after a standard Fading test performed on the same commercial brake disc made of cast iron of FIG. 1, but covered with the anti-wear, anti-corrosion coating with plasticity such as to have a reduced propensity to form micro-cracks according to the disclosure composed of particles of chromium carbide ($Cr_3C_2$) dispersed within a metallic matrix of an alloy of NiCr, referred to as Disc A using brake pads made with a compound of the NAO (Non-Asbestos Organics) type.
Figure 5B:
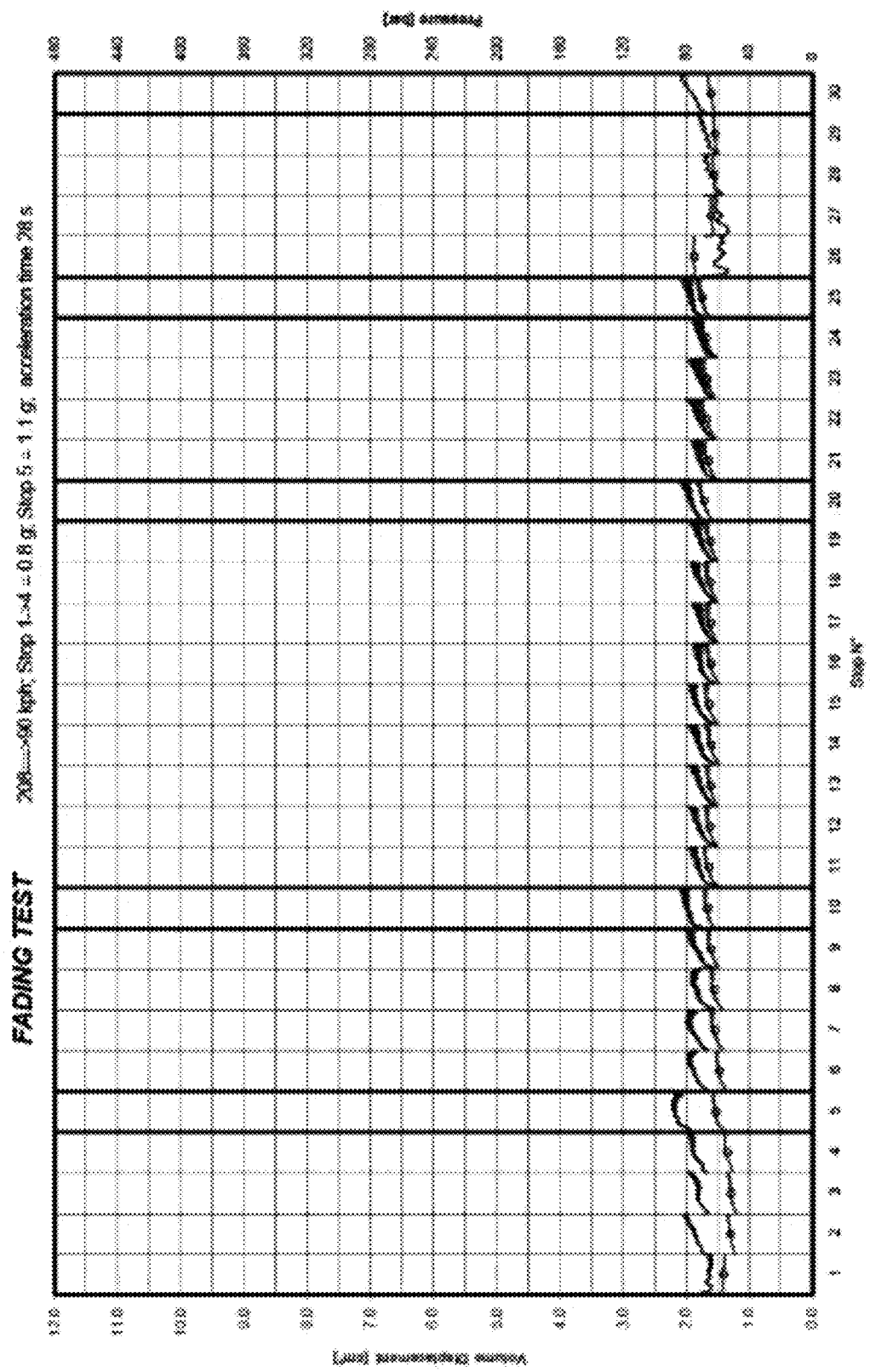
Figure 7:
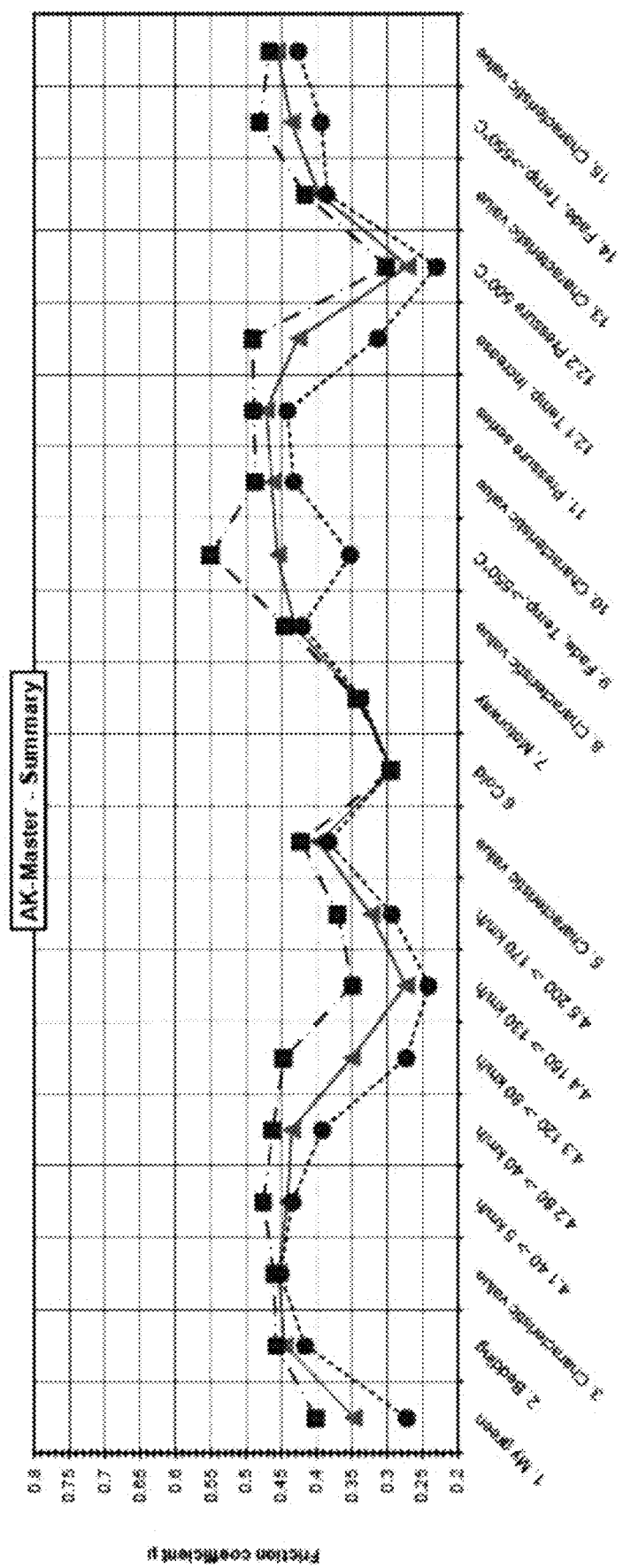
FIG. 7 shows an extract of the graph obtainable after a standard AK-Master test performed on a commercial brake disc made of cast iron using brake pads made with an LS (Low Steel) type compound.
Figure 8A:
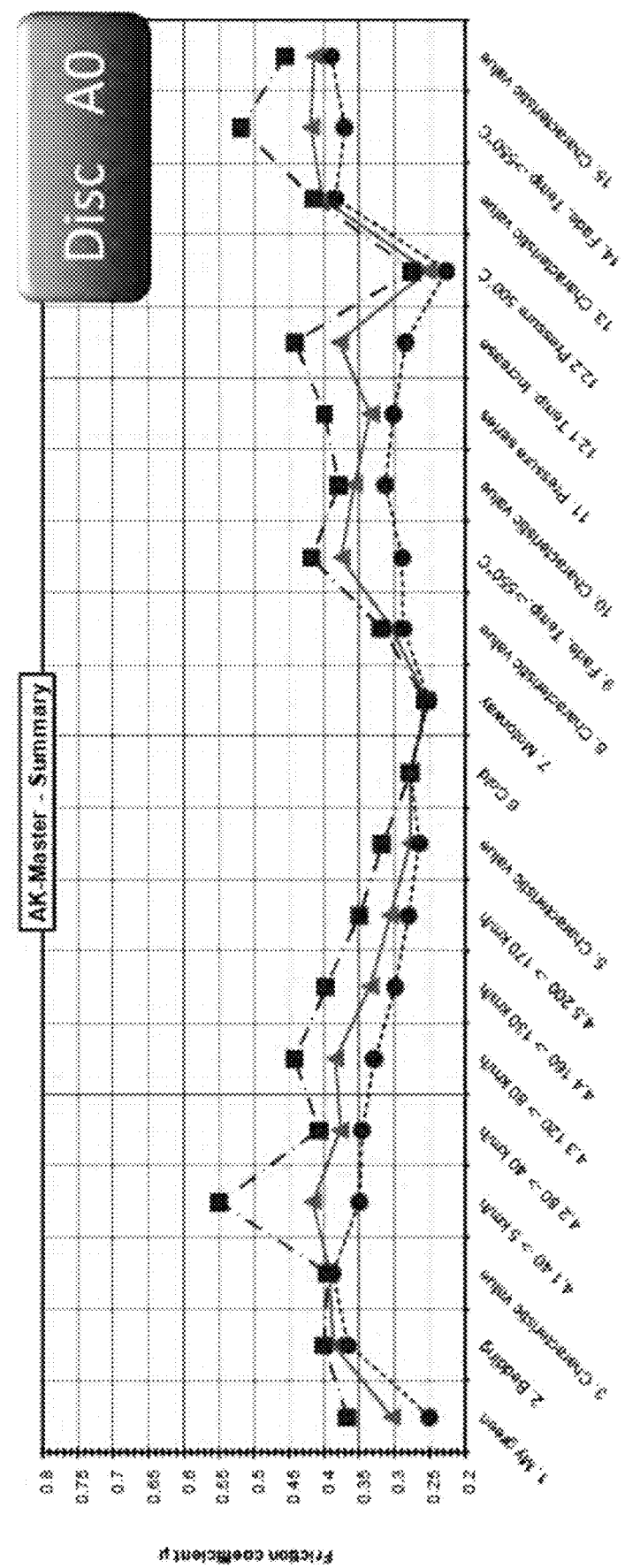
FIG. 8 shows the same graphs as FIG. 1 obtainable after a standard AK-Master test performed on the same commercial brake disc made of cast iron of FIG. 7, but covered in one case (disc A0) with the coating currently on the market based upon WC, illustrated for comparative purposes, and in the lower graph (disc A) coated with particles of chromium carbide ($Cr_3C_2$) dispersed within a metallic matrix of an alloy of NiCr, using brake pads made with a compound of the LS (Low Steel) type.
Figure 8B:
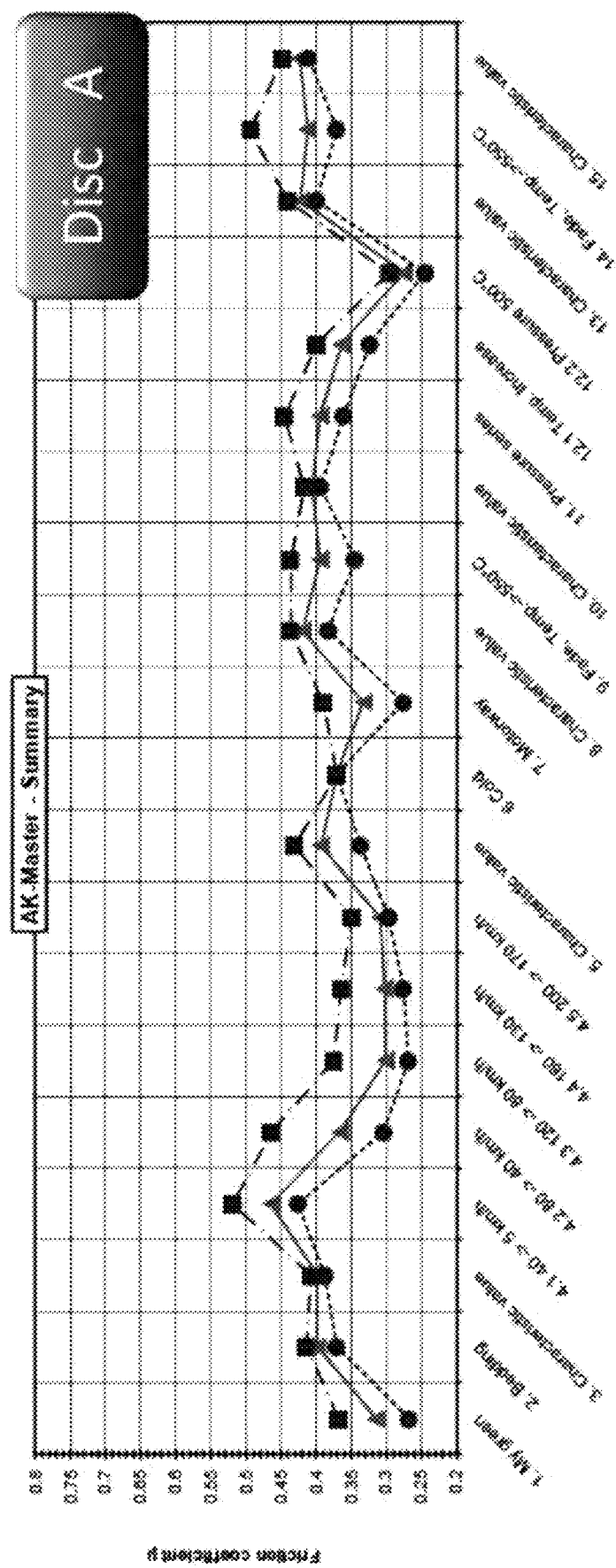
Figure 9A:
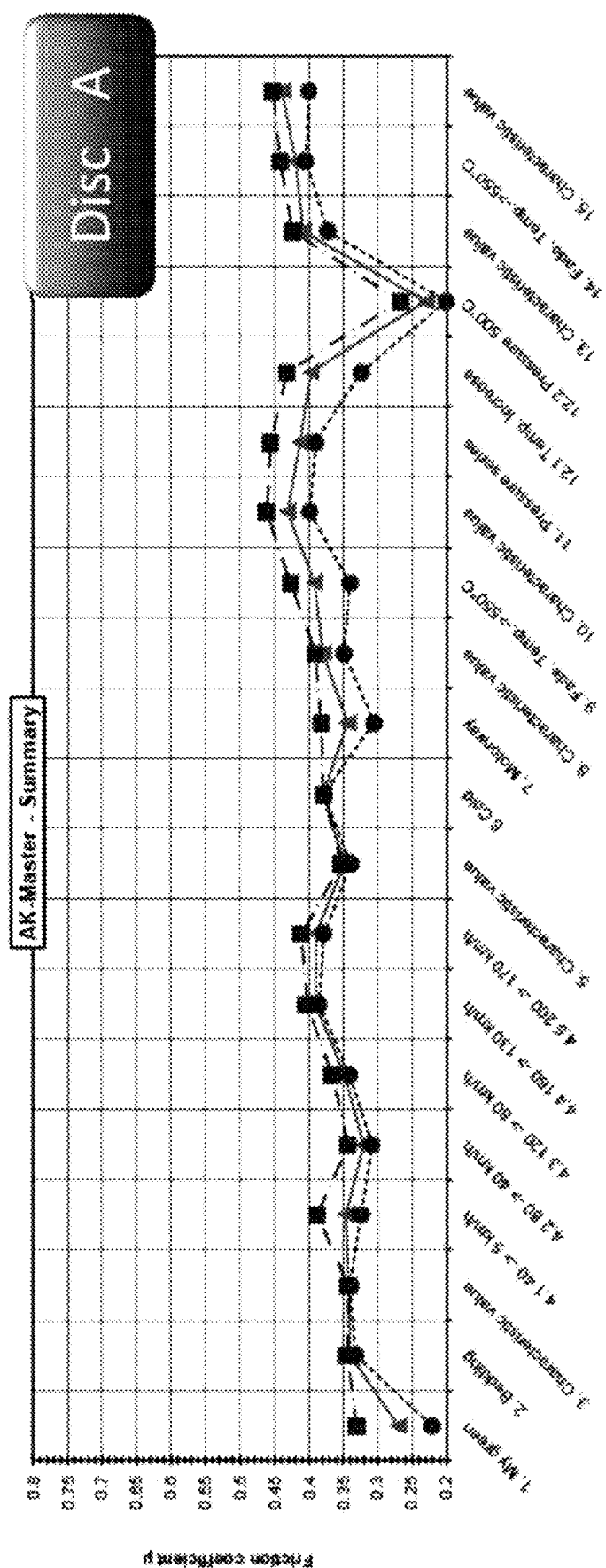
FIG. 9 shows the same graphs of FIG. 7 obtained after a standard AK-Master test performed on the same commercial cast iron brake disc of FIGS. 1 and 7, but coated with the coating produced according to the disclosure, composed (upper graph—disc A) of particles of chromium carbide ($Cr_3C_2$) dispersed within a metallic matrix of an alloy of NiCr and (lower graph—disc B) composed of several metallic materials in order to create a metallic matrix constituted by a chromium-nickel austenitic steel and can be composed of an alloy of FeNiCrMoSiC (iron-nickel-chromium-molybdenum-silicon-carbon), e.g. that known by the trade name Diamalloy®, using brake pads made with a compound of the NAO (Non-Asbestos Organics) type.
Figure 9B:
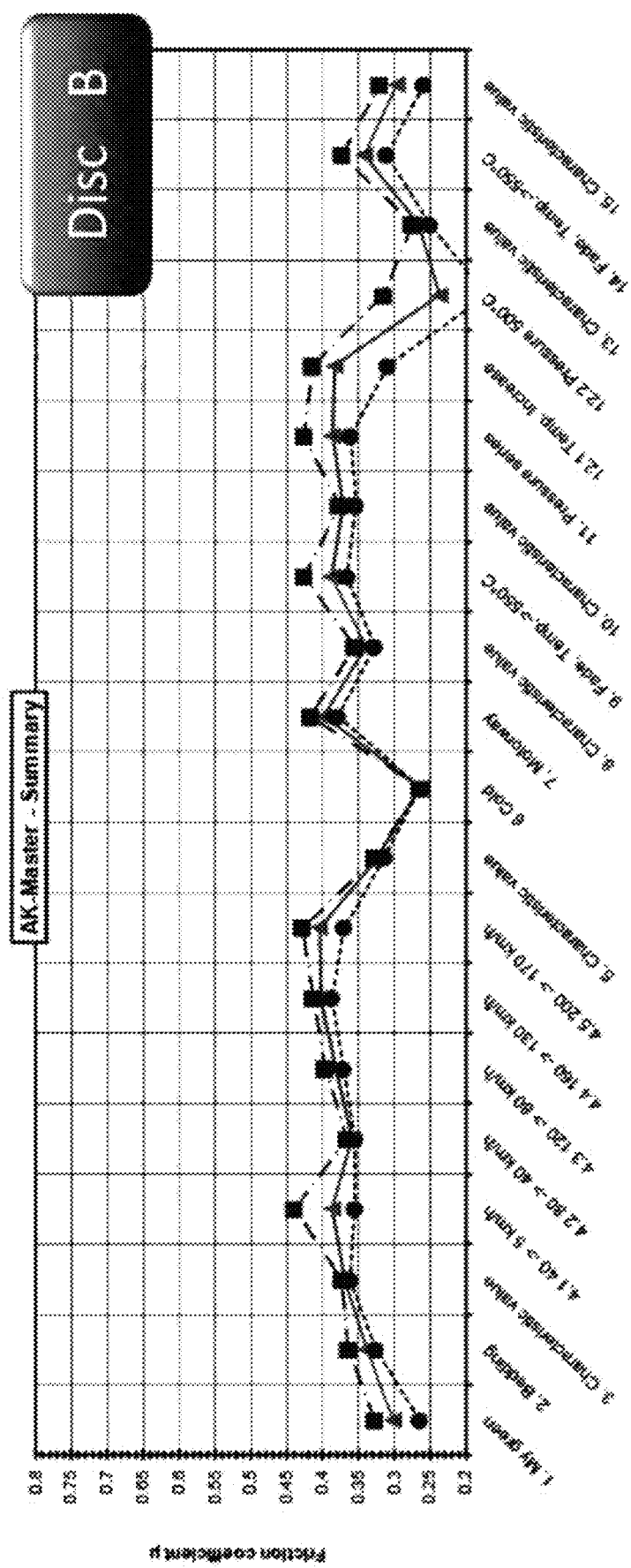
Figure 10A:
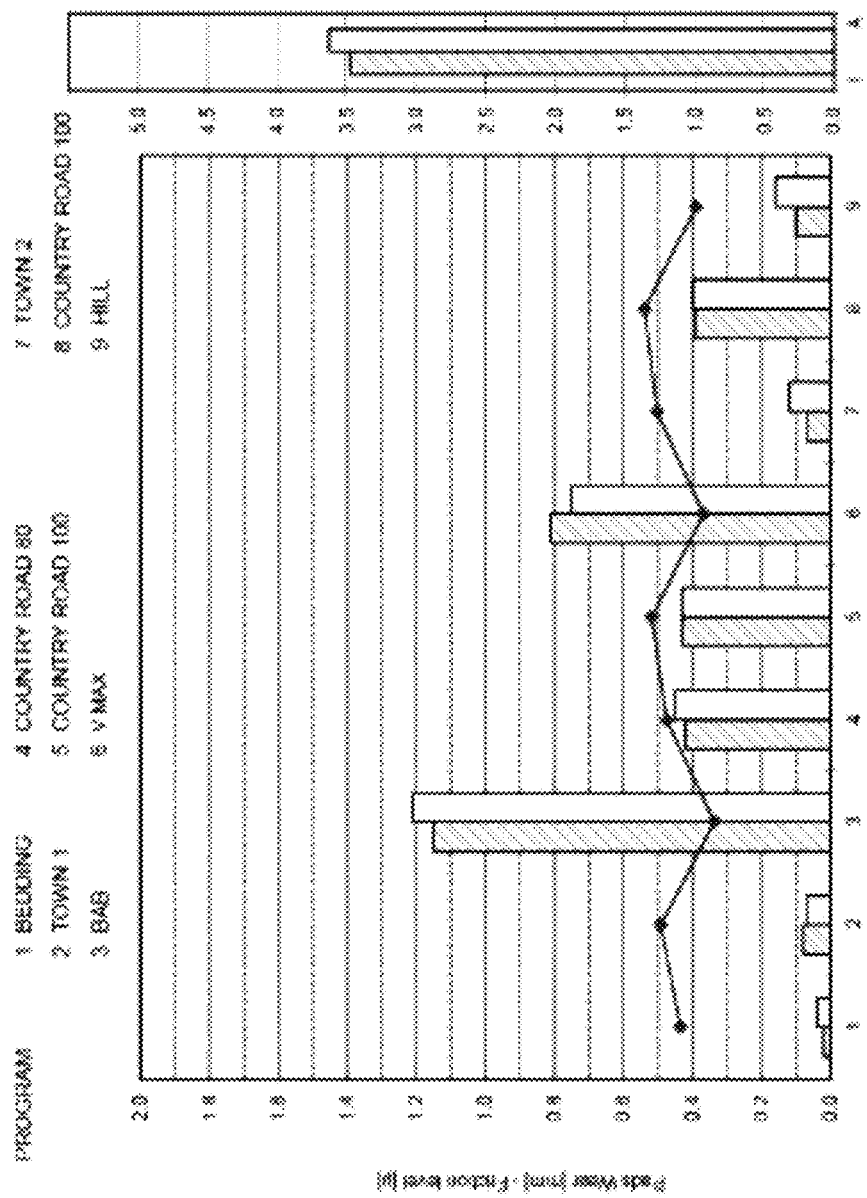
FIG. 10 compares the results of a standard wear test performed on the same commercial brake disc made of cast iron as in FIG. 1, respectively: bare (uncoated), coated with the coating currently on the market composed of WC deposited on a bed of nickel, used for comparative purposes, and coated with the anti-wear, anti-corrosion coating with plasticity such as to have a reduced propensity to form micro-cracks, of the present disclosure and composed of particles of chromium carbide ($Cr_3C_2$) dispersed within a metallic matrix of an alloy of NiCr, using brake pads made with a compound of the LS (Low Steel) type.
Figure 10B:
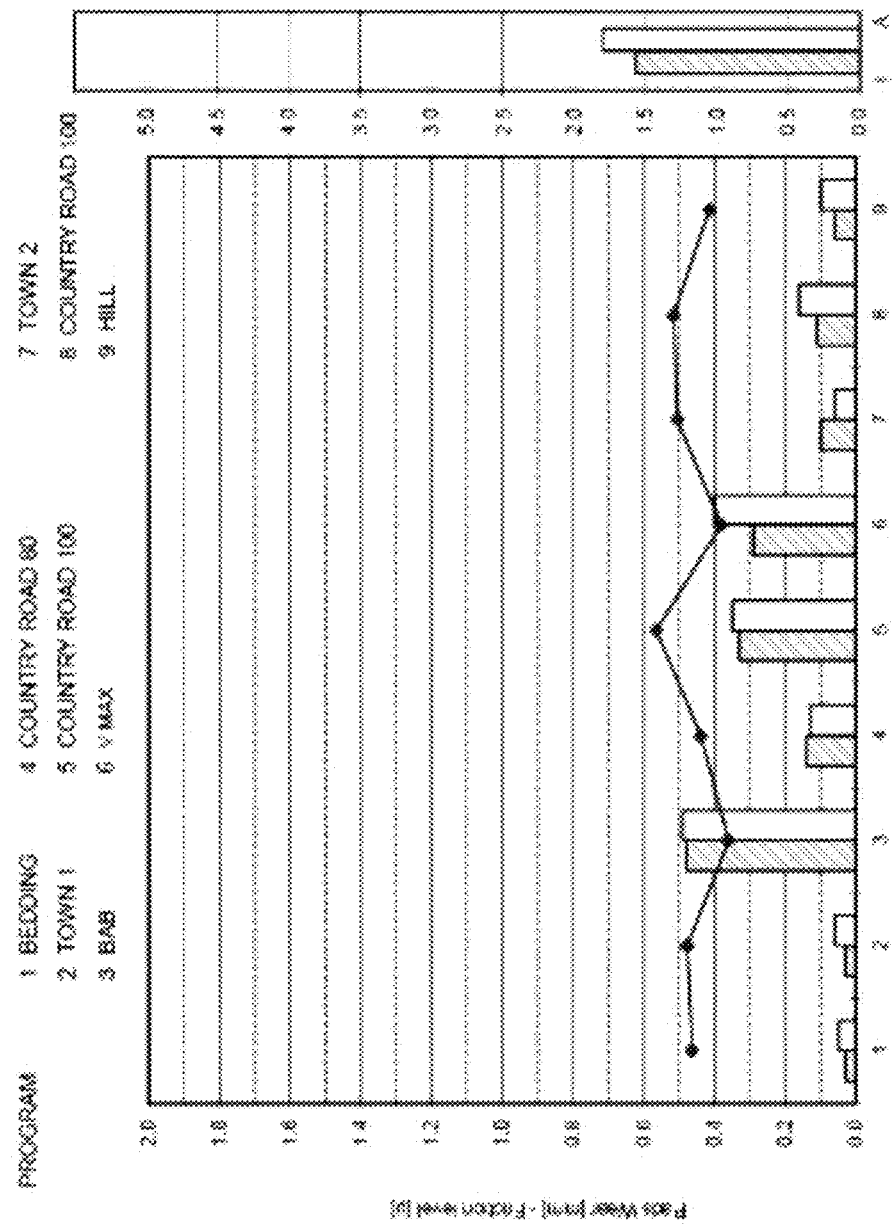
Figure 10C:
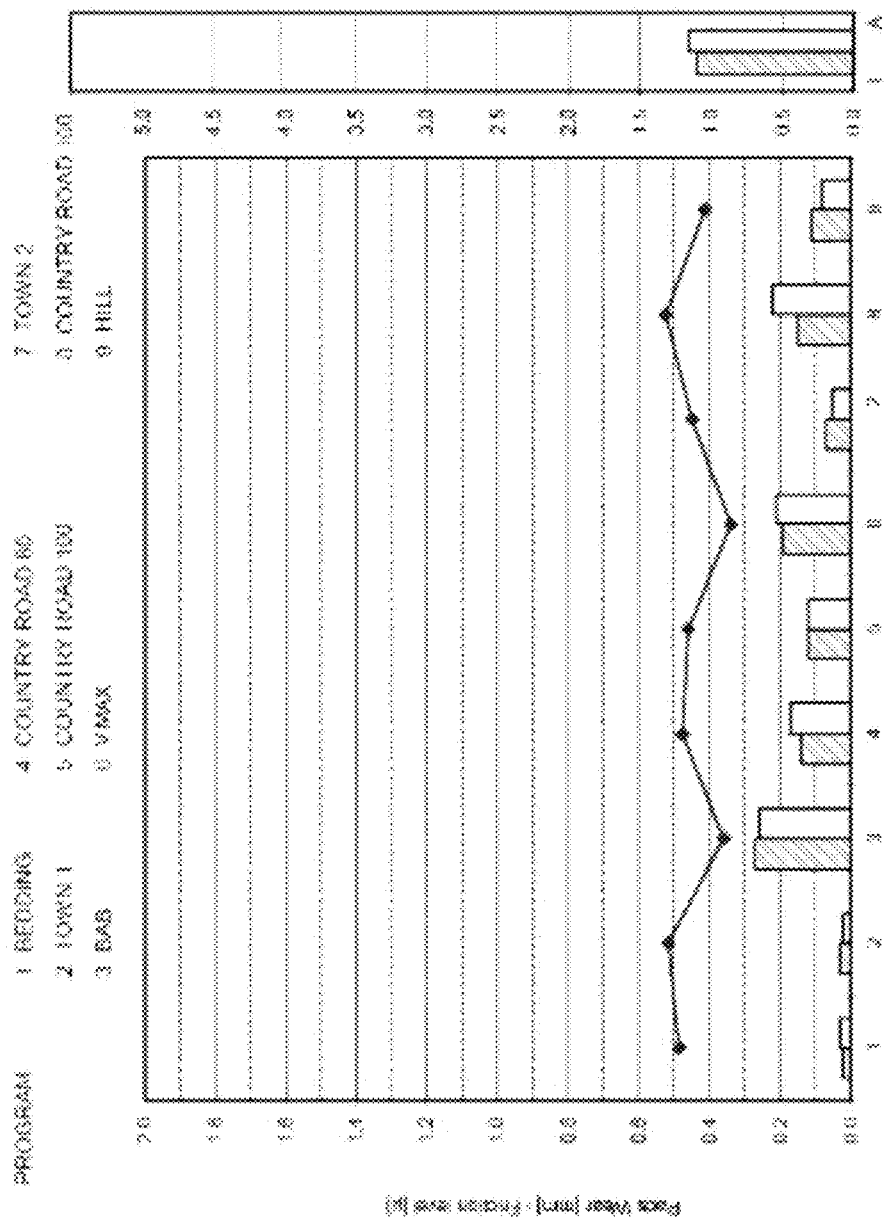
Figure 11A:
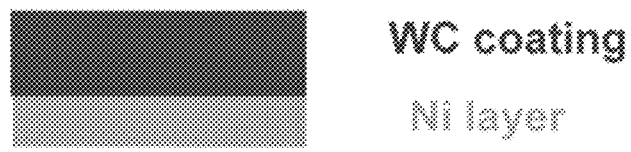
FIG. 11 shows the micrographs of the coatings based upon WC deposited on a bed of nickel (disc A0 coated, currently on the market and used for comparative purposes), based upon $Cr_3C_2$ dispersed within a nickel-chromium matrix according to the disclosure and deposited in accordance with the procedure described in this disclosure (disc A), and based upon several metallic materials in order to create a metallic matrix constituted by a chromium-nickel austenitic steel and can be composed of an alloy of FeNiCrMoSiC (iron-nickel-chromium-molybdenum-silicon-carbon), e.g. that one known by the trade name Diamalloy® (disc B)
Figure 11A:
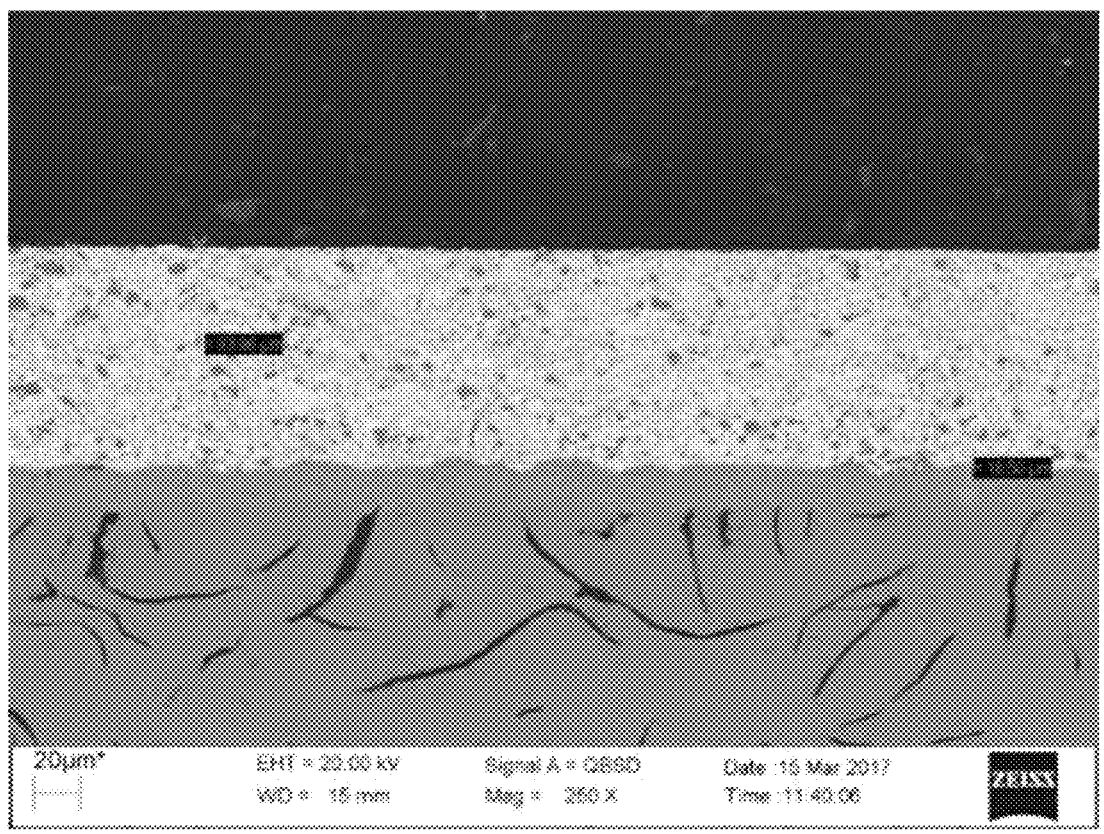
Figure 11A:
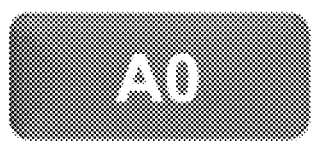
Figure 11B:
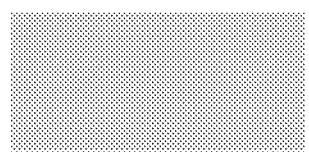
Figure 11B:
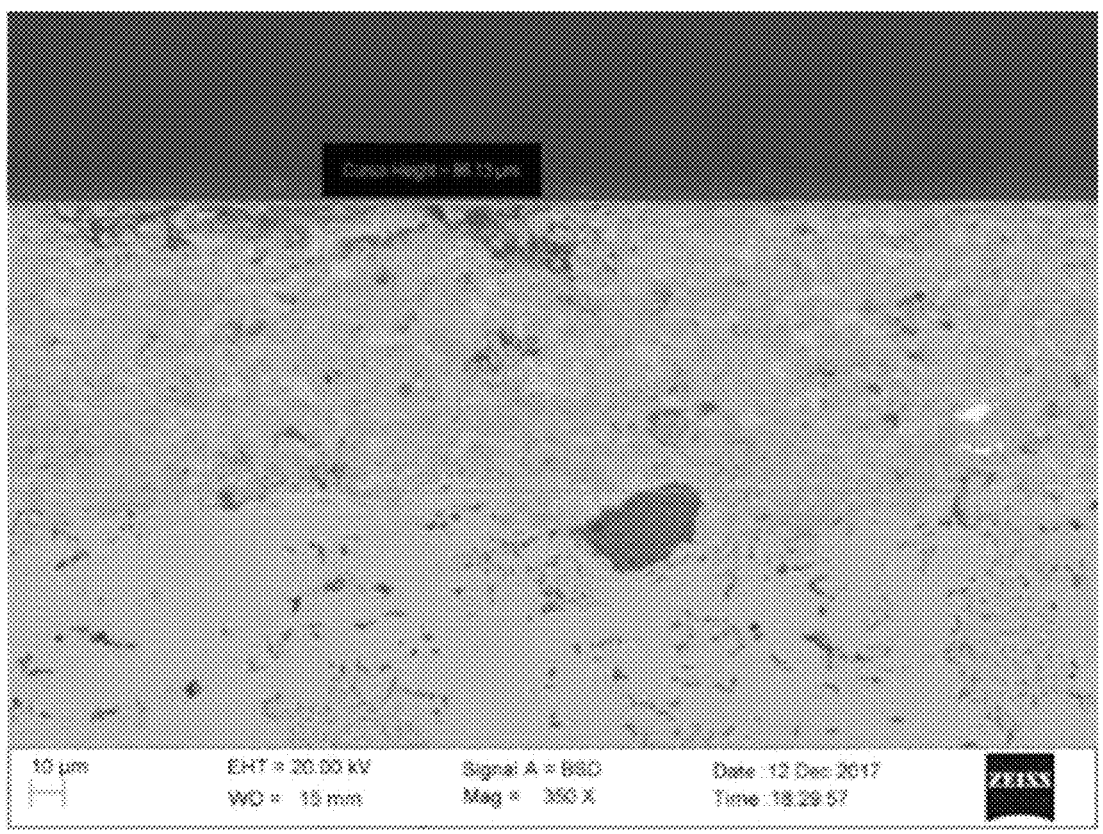
Figure 11B:
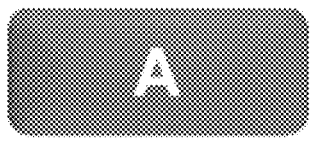
Figure 11C:
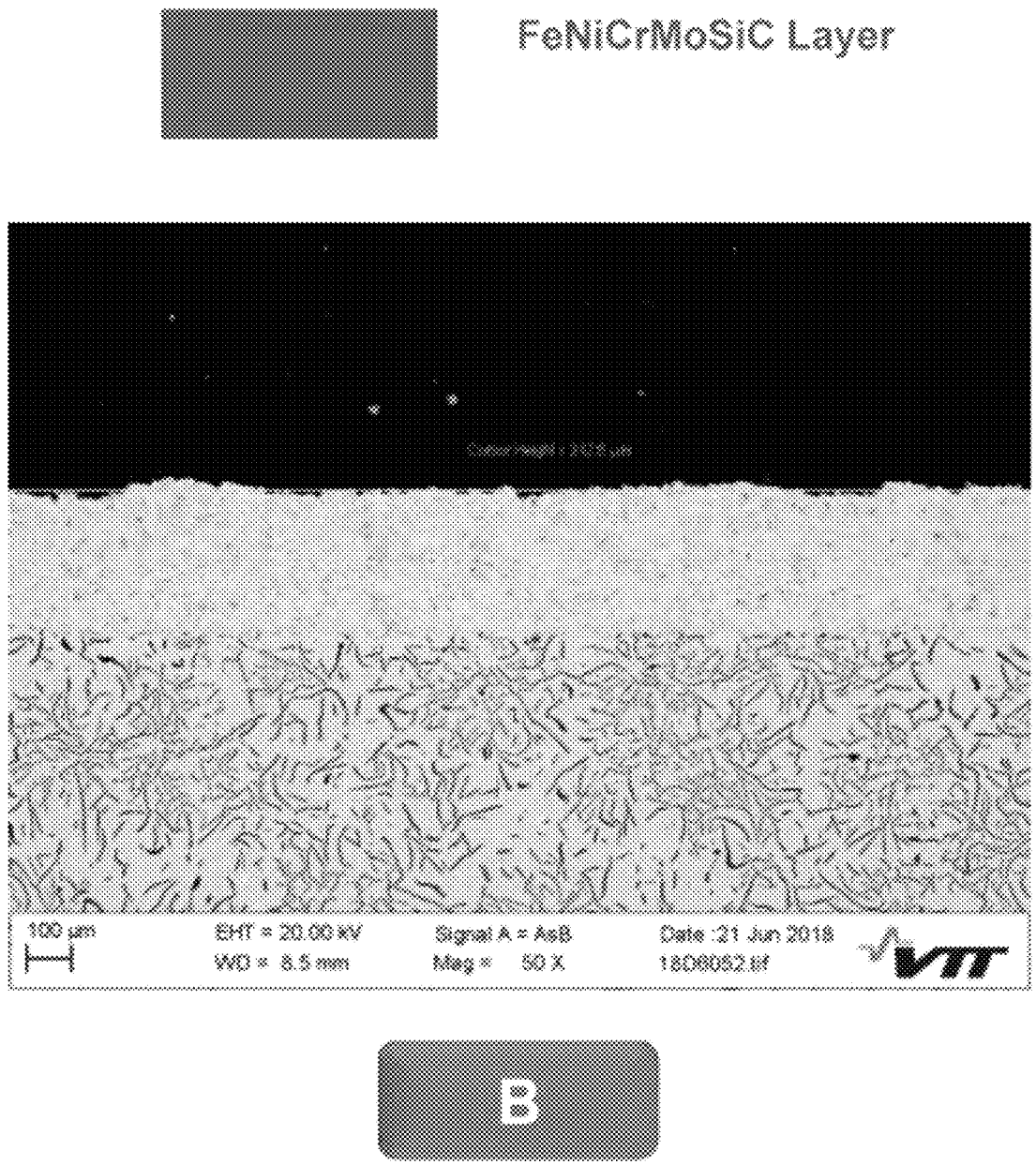

In some embodiments of the present disclosure, an anti-wear coatings for brake discs without the drawbacks of the known art is described. In particular, in some embodiments of the disclosure, a method for the simultaneous reduction in wear of both the brake discs and the brake pads associated therewith is disclosed. Moreover, in some embodiments of the disclosure, a disc brake furnished with an anti-wear coating which, compared to an uncoated brake disc, results in a reduction in the wear of the brake pads is disclosed.

The disclosure that follows therefore relates to embodiments of an anti-wear coating for a brake disc, to a method for reducing the wear of both the brake discs and the brake pads associated therewith, and to a coated brake disc itself.

During the break-in period the friction coefficient can vary considerably, giving a feeling of insecurity in braking to the driver of the vehicle. Embodiments of the disclosure can be used to reduce or eliminate this break-in period.

Furthermore, reduced wear of the brake discs can usually be accompanied by an undesirable increase in the wear of the brake pads. Embodiments of the disclosure can also alleviate the wear on the brake pads.

The disclosure also relates to embodiments of anti-wear and anti-corrosion coating systems for a brake disc, which can result in an increase in resistance to corrosive phenomena of any kind on the same disc.

The disclosure further relates to embodiments of coating systems provided with a such as to have a reduced propensity to form micro-cracks under conditions of tribo-mechanical stress with a high energy load that results in a reduction, if not in the total disappearance, in the cumulative mechanical stress phenomena and the creation and propagation of superficial cracks upon the braking surface Moreover, the disclosure relates to the use of such an anti-wear and anti-corrosion coating with plasticity such as to have a reduced propensity to form micro-cracks under conditions of tribo-mechanical stress and to a braking system which can comprise, for example, an element to be braked which can include a disc or a brake drum made of cast iron or steel, though the particular material is not limiting, and coated at least in part with an anti-wear and anti-corrosion coating with adequate plasticity according to the disclosure. In some embodiments, the system can further include at least one braking element which can include a brake pad or brake shoe, suitable for cooperating by means of friction with the element to be braked, wherein the braking element has a friction layer or block intended to cooperate with the element to be braked. The braking element can be made with any friction material free of asbestos and copper or the alloys thereof, generically referred to as "Cu-free", in particular of the so-called LS (Low Steel) type or of the NAO (Non-Asbestos Organics) type.

NAO materials are the Non-Asbestos Organics that usually are identified as the materials that has not Fe-based metals inside. The LS is identified also as a materials without asbestos but with Fe-based metals inside like metal or powder iron or steel.

In some embodiments, the braking element may be copper free. In some embodiments, the braking element may be asbestos free. In some embodiments, the braking element may be copper and asbestos free.

The components of the composition or raw mixture of the friction material to be coupled with the anti-wear coating according to the disclosure can be components used in those friction materials. For example, embodiments of the composition can include a fibrous material, for example including inorganic and/or organic and/or metallic fibers, a binder, a filler or charge ("filler"), one or more lubricants or friction modifiers, and one or more abrasives. In some embodiments, one or more of the elements may be removed as desired.

In particular, the fibers may include any organic fiber or inorganic fiber other than asbestos, or else any metallic fiber that is commonly used in friction materials. Illustrative, but not exhaustive, examples include inorganic fibers such as fiberglass, rock wool, wollastonite, sepiolite and attapulgite, and organic fibers such as carbon fibers, aramid fibers, polyimide fibers, polyamide fibers, phenolic fibers, cellulose and acrylic fibers or PAN (Poly-Acryl-Nitrile). Metallic fibers such as, for example, steel fibers, stainless steel, aluminum fibers, zinc, metal alloys such as Iron-Tin, etc. can be used as well.

The fibers can be used in the form of either short or long fibers, and the particular length is not limiting.

In order to ensure sufficient mechanical strength, the quantity of fibers can be between 1% and 50% by volume compared to the total volume of the friction material. In some embodiments, they can be between 8% and 30% by volume.

According to the disclosure, in some embodiments an organic or inorganic charge or filler can also be used as a raw component.

Numerous materials can be used as organic or inorganic charges. Illustrative non-limiting examples include calcium carbonate precipitate, barium sulfate, magnesium oxide, calcium hydroxide, calcium fluoride, slaked lime, talc, mica and vermiculite.

These may be used by themselves or in combinations of two or more. The quantity of such charges can be between 1% and 60% by volume based upon the total composition of the friction material.

In some embodiments, an organic binder can be used. The organic binder can be any binder known and commonly used in friction materials and in general this is a thermosetting resin or a mixture of thermosetting resins.

Illustrative non-limiting examples of suitable binders include phenolic resins, melamine resins, epoxy resins; various modified phenolic resins such as epoxy-modified phenolic resins, oil-modified phenolic resins, alkylbenzene-modified phenolic resins.

Any one or combinations of one or more of these compounds can be used. In order to ensure sufficient mechanical resistance and wear resistance, the binder can be included in an amount between 2% to 50% by volume based upon the total composition of the raw compound or the final friction material obtained.

In some embodiments, a friction modifier can be used. The friction modifier (which may include all or part of the filler or charge) may be an organic charge, such as cashew nut powder, rubber powder (pulverized tread rubber powder), a variety of non-vulcanized rubber particles, a variety of vulcanized rubber particles, an inorganic charge, such as barium sulfate, calcium carbonate, a calcium hydroxide, vermiculite and/or mica, an abrasive, such as silicon carbide, alumina, a zirconium silicate, a lubricant, such as molybdenum disulfide, a sulfide of tin, a zinc sulfide, iron and non-ferrous sulfides, metallic particles different from copper and copper alloys, and/or a combination of all of the above.

The abrasives used in the present disclosure can be classified as follows (the following list is only indicative, not necessarily exhaustive, and non-limiting):

Mild abrasives (Mohs 1-3): talc, calcium hydroxide, potassium titanate, mica, vermiculite, kaolin;

Medium abrasives (Mohs 4-6): barium sulfate, magnesium oxide, calcium fluoride, calcium carbonate, wollastonite, calcium silicate, iron oxide, silica, chromite, zirconium oxide, zinc oxide;

Strong abrasives (Mohs 7-9): silicon carbide, zirconium sand, zirconium oxide, zirconium silicate, zirconium, corundum, alumina, mullite.

The content of the friction modifier, according to the desired friction characteristics, can be between 10% to 80% by volume compared to the volume of the entire material.

In general, the friction material components used according to the disclosure are as follows:
1. binders
2. fillers
3. lubricants/friction modifiers
4. abrasives (which may form part of the fillers)
5. fibers (inorganic/organic/metallic)
6. any metallic powders However, it is understood that one or more of any of the above elements can be removed as desired.

Brake pads made with the aforementioned friction materials can be coupled/operatively associated with an anti-wear and anti-corrosion coating, applied to at least one friction surface of the brake discs, configured to cooperate in use with the brake pad and consisting in a single layer made using a selected combination of:
particles of chromium carbide ($Cr_3C_2$) dispersed within a metallic matrix of an alloy of NiCr; and/or
particles of several metallic materials in order to create a metallic matrix constituted by a chromium-nickel austenitic steel and can include an alloy of FeNiCrMoSiC (iron-nickel-chromium-molybdenum-silicon-carbon), e.g. that known by the trade name Diamalloy®.

The metallic matrix in austenitic steel can have a chemical composition that varies within the following limits:

$35<Fe<88$; $10<Cr<35$; $2<Ni<18$ (proportions in % by weight)

In some embodiments, Cr can be used over Ni. In some embodiments, molybdenum can be included from 1.5% to 18% by weight, and other alloying elements in lower percentages, such as Si, Mn, B, W, V, C, Cu, Co, Nb, that are nonetheless added in a total amount that is less than the sum of the content of Fe, Cr and Ni.

In some embodiments the metal matrix in austenitic steel can have the following chemical composition:

| Product | Fe % w | Cr % w | Mo % w | Ni % w | Si % w | B % w | Cu % w | C % w |
| --- | --- | --- | --- | --- | --- | --- | --- | --- |
| 1008 | balance | 18 | 12 | 4 | 3.5 | 3 | 2.5 | 0.6 |
| 1009 | balance | 33 | | 8 | | 4.8 | | 0.6 |
| 1010 | balance | 28 | 4.5 | 16 | 1.5 | | | 1.75 |

In some embodiments the coating including metallic particles of chromium carbide ($Cr_3C_2$) dispersed within a metallic matrix of an alloy of NiCr has a composition of up to 75% w of chromium carbide the balance being the NiCr alloy at 20 or 25% w of Cr.

The single layer according to the disclosure, when it is based upon chromium carbides dispersed within a nickel matrix has a Vickers (Hv) hardness ranging between 500 and 1200. In some embodiments, the single layer can have a Vickers hardness between 600 and 800 Hv. In some embodiments, the single layer can have a reduced elastic modulus between 160 and 180.

The single layer according to the disclosure, when it is based upon Cr—Ni austenitic steel, such as FeNiCrMoSiC, can have a Vickers (Hv) hardness between 300 and 800. In some embodiments, the single layer can have a Vickers hardness of between 400 and 700 Hv e a reduced elastic modulus of between 145 and 160.

The anti-wear and anti-corrosion coatings with adequate plasticity in order to have a reduced propensity to form micro-cracks under the aforementioned conditions of tribo-mechanical stress can be preferably applied by thermal spray by means of HVOF technology and the particles of chromium carbide dispersed within the NiCr metallic matrix or those components of the Diamalloy alloy are used as powders in spheroidal form. However, other methods of applying the coatings with equivalent results can be used as well, e.g. Plasma Spray, Laser Cladding, Cold Laser Deposition, Laser Spray Deposition.

The anti-wear and anti-corrosion coatings with adequate plasticity in order to have a reduced propensity to form micro-cracks under conditions of tribo-mechanical stress according to the disclosure have a total thickness between about 20 and about 400) micrometers and, after thermal spray coating and grinding, a surface roughness between 0.05 and 2 micrometers.

The use of such selected materials for the brake pads and for the anti-wear coating with adequate plasticity in order to have a reduced propensity to form micro-cracks under conditions of tribo-mechanical stress of brake discs makes it possible to implement a method for the simultaneous reduction in wear of a brake disc and of associated brake pads, including the steps of:
preparing brake pads using a friction material formulation of the Copper-Free family which can be a LS (Low Steel) or an NAO (Non-Asbestos Organics);
covering at least one friction surface of a brake disc intended to cooperate in use with a brake pad with an embodiment of the anti-wear and anti-corrosion coating with adequate plasticity of the present disclosure. This can include a selected combination of particles of chromium carbide ($Cr_3C_2$) dispersed within a metallic matrix of an alloy of NiCr, and/or particles of several metallic materials in order to create a metallic matrix constituted by a chromium-nickel austenitic steel and can include of an alloy of FeNiCrMoSiC (iron-nickel-chromium-molybdenum-silicon-carbon), known by the trade name Diamalloy®;
coupling together the previously prepared brake pads and the brake disc.

The anti-wear and anti-corrosion coating is applied by means of the HVOF (High Velocity Oxygen Fuel) thermal spray technology.

In some embodiments, brake pads that are made with a friction material belonging to the Copper Free family, in particular of the LS (Low Steel) or NAO (Non-Asbestos Organics) type, are coupled together with an anti-wear coating applied to at least one friction surface of the brake disc composed of particles of chromium carbide ($Cr_3O_2$) dispersed within a metallic matrix of an alloy of NiCr, or particles of several metallic materials in order to create a metallic matrix constituted by a chromium-nickel austenitic steel and can be composed of an alloy of FeNiCrMoSiC (iron-nickel-chromium-molybdenum-silicon-carbon), known by the trade name Diamalloy®.

In this way, a braking system is also implemented including an element to be braked composed of a disc or brake drum made of cast iron or steel and at least one braking element including a brake shoe or pad, suitable for cooperating by friction with the element to be braked. In some embodiments, the element to be braked has at least one friction surface configured to cooperate with the braking element, which friction surface is covered with an anti-wear and anti-corrosion coating according to that previously described, whilst the braking element comprises at least one friction material block configured to cooperate with the element to be braked, the friction material being of the Copper Free family, in particular of the LS (Low Steel) or NAO (Non Asbestos Organics) type.

The examples and comparative examples are reported here by way of illustration and are not intended to limit the disclosure.

Example 1

Various friction material compositions of two different types were prepared, as indicated in Table 1. For each of the two families of friction material compositions, referred to as LS and NAO, (both known) a friction material is prepared according to the known composition that is currently in use.

TABLE 1

|  | FAMILIES | |
| --- | --- | --- |
| COMPONENTS | LS % Vol | #NAO % Vol |
| Fibers | 10 | 6 |
| Organic additives | 11 | 14 |
| Resin | 17 | 21 |
| Strong abrasive | 12 | 11 |
| Medium abrasive | 11 | 5 |
| Mild abrasive | 27 | 29 |
| Sulfides | 3 | 4 |
| Carbon | 9 | 10 |

In Table 1, for the mild, medium and strong abrasives, one or more materials were chosen as indicated below:
Mild abrasives (Mohs 1-3): talc, calcium hydroxide, potassium titanate, mica, kaolin;
Medium abrasives (Mohs 4-6): barium sulfate, magnesium oxide, calcium fluoride, calcium carbonate, wollastonite, calcium silicate, iron oxide, silica, chromite, zirconium oxide, zinc oxide
Strong abrasives (Mohs 7-9): silicon carbide, zirconium sand, zirconium oxide, zirconium silicate, zirconium, corundum, alumina, mullite.

Example 2

The friction material compositions according to Table 1 were molded onto identical metal substrates and cured in a conventional manner, in order to form identical brake pads, except for the chemical composition of the friction material.

In particular, the brake pad pressing was performed at a temperature between 60 and 200° C. at a pressure from 150 to 1800 kg/cm² for a duration between 2 and 10 minutes or by preforming the mixing within a die and thereafter pressing at a temperature from 130 to 180° C. at a pressure from 150 to 500 kg/cm² (14.7-49 MPa) for a duration of 2 to 10 minutes.

The resulting pressed article is typically post-cured by means of heat treatment from 150 to 400° C. for a duration between 5 minutes to 15 hours, it is then spray painted or powder-painted, kiln-dried and possibly machined where necessary in order to produce the final product. The effective braking area of each single pad is 52.6 cm².

Example 3

A series of commercial 18 inch lamellar cast iron brake discs was purchased, all of which are identical, having the following characteristics: diameter 356 mm; thickness (width along the axis of rotation) 28 mm; one disc is left with bare surfaces; the other brake discs are coated on both opposing faces, defined by the friction surfaces intended to cooperate in use with the brake pads, with the anti-wear and anti-corrosion coatings with adequate plasticity in order to have a reduced propensity to form micro-cracks, marked as disc A and disc B, having the compositions and characteristics indicated in Table 2.

TABLE 2

|  | Chemical composition | Microhardness (HV) | Roughness after grinding (Ra, μM) |
| --- | --- | --- | --- |
| A | $Cr_3C_2$—NiCr | 500-1200 | 0.15-0.3 |
| B | FeNiCrMoSiC | 300-800 | 0.15-0.3 |

The coating containing chromium carbide contains an amount of chromium carbide up to 75% by weight and the remainder is a Ni—Cr alloy at 20% or 25% of chromium. In the present example a 75% chromium carbide and 25% NiCr alloy coating was used. The austenitic steel coating has the following composition (weight percentages): 28% Cr—16% Ni—4.5% Mo—1.5% Si—1.75% C—balance Fe.

The coatings of Table 2 are applied by thermal spray, by means of HVOF technology (High Velocity Oxygen Fuel spraying): a mixture of gaseous or liquid fuel and oxygen is fed into a combustion chamber, where they are continuously burned; the resulting hot gas, at a pressure close to 1 MPa, is emitted through a converging-diverging nozzle and travels through a straight section; the fuels may be gases (hydrogen, methane, propane, propylene, acetylene, natural gas, etc.) or liquids (kerosene, etc.); the velocity of the jet at the outlet of the tube (>1000 m/s) exceeds the speed of sound. The powder materials are in turn injected into the stream of gas, which accelerates the powder up to 800 m/s and the current of hot gas and powder is directed towards the surface to be coated; the powder partially melts within the gaseous flow and is deposited onto the substrate by providing a coating with low porosity and high adhesive strength.

After coating with a thermal spray and subsequent grinding the anti-wear and anti-corrosion coating with adequate plasticity in order to have a reduced propensity to form micro-cracks has a surface roughness which may vary from point to point but is anyway between 0.05 and 2 micrometers. The average thickness of the coatings can be between 20 and 400 micrometers and in the present example is of about 90 micrometers.

Example 4

Using the brake discs of example 3 and the brake pads of example 2 several Fading and AK Master tests are performed, using different combinations of disc/pad. The results obtained are illustrated in the figures from 1 to 5 and 7 to 9, wherein the combinations used are indicated:
Bare cast iron: uncoated brake disc coupled to brake pads made with LS or NAO friction material;
Disc A0: brake disc coated with WC material deposited on a bed of nickel currently on the market and used for comparative purposes, coupled to brake pads made with LS or NAO friction material;

Disc A: brake disc coated with an anti-wear, anti-corrosion material with adequate plasticity in order to have a reduced propensity to form micro-cracks according to the invention, composed of particles of chromium carbide ($Cr_3C_2$) dispersed within a metallic matrix of an alloy of NiCr, coupled to brake pads made with LS or NAO friction material;

Disc B: brake disc coated with anti-wear, anti-corrosion material constituted by a chromium-nickel austenitic steel in an alloy of FeNiCrMoSiC (iron-nickel-chromium-molybdenum-silicon-carbon) obtained from powders of the individual metallic component materials in order to create a compound composed of an alloy of FeNiCrMoSiC (iron-nickel-chromium-molybdenum-silicon-carbon), called Diamalloy®, coupled to brake pads made with LS or NAO friction material.

Also evaluated at the end of the test are the wear of both the brake disc and the brake pads used in each Fading and AKM test. The results obtained are given in tables 3 and 4.

TABLE 3

| | Fading | |
|---|---|---|
| MATERIALS | PAD WEAR | DISC WEAR |
| CAST IRON - LS | 1.5 mm | 5.3 gr |
| Disc A0 - LS | 0.29 mm | 2.0 gr |
| Disc A0 - NAO | 5.14 mm | 3.3 gr |
| Disc A - LS | 0.31 mm | 1.4 gr |
| Disc A - NAO | 1.18 mm | 3.8 gr |

TABLE 4

| | AKM | |
|---|---|---|
| MATERIALS | PAD WEAR | DISC WEAR |
| CAST IRON - LS | 0.49 mm | 7.1 gr |
| Disc A0 - LS | 0.49 mm | 2.0 gr |
| Disc A - LS | 0.38 mm | 0.6 gr |
| Disc A - NAO | 0.21 mm | 1.8 gr |
| Disc B - NAO | 0.48 mm | 4.0 gr |

Discussion of the Results

As is evident from what has been described so far, the materials used for the coating are new in the field of anti-wear coatings for brake discs. In fact, the materials are based upon chromium carbides dispersed within a metallic matrix of a nickel-chromium alloy, or based upon a chromium-nickel austenitic steel and preferably in an alloy obtained from a combination of several metallic materials in order to create a compound composed, in the illustrated examples, of an alloy of FeNiCrMoSiC (iron-nickel-chromium-molybdenum-silicon-carbon), known by the trade name Diamalloy®.

From the comparison of the graphs that are derivable by means of the Fading test, the better braking behavior is evident, which is reflected in greater friction stability, ensured by the brake discs coated with the first material included in the present disclosure as compared to bare cast iron, composed of particles of chromium carbide applied as per the method described in the present disclosure (disc A), with both known friction materials tested, belonging to the two families of friction materials that are most commonly used.

With the further comparison of the AKM graphs, the same or better behavior is evident of the friction material employing the second coating included in the present disclosure, composed of the Diamalloy® alloy (disc B) compared to both the bare cast iron and the material of the coating currently on the market (disc A0).

Furthermore, for the coatings of the present disclosure, there is good maintenance of the friction coefficient during braking. Therefore it is evident the elimination or, at least, the very strong reduction of the drawback consisting in the undesirable lengthening of the "break-in" period of the brake pad/disc coupling coated with traditional anti-wear layers.

Observing then the wear data reported in Table 3 it can be seen that, compared to the wear values (measured in mm of pad loss at the end of the Porsche Fading test compared to the new material) of the brake pads made with the NAO type friction compound, coupled to the disc coated with WC deposited on a bed of nickel currently on the market and used for comparative purposes, when coupled together, of 5.14 mm, while the material of the present disclosure indicates the wear of the NAO material at very similar values to those obtained with the bare cast iron disc (uncoated).

FIG. 6 highlights the thermal conductivity ensured by the coating of the present disclosure based upon particles of chromium carbide deposited using the method described in the present disclosure, in comparison to the coating in WC deposited on a bed of nickel currently on the market and used for comparative purposes, the conductivity of the coating according to the disclosure that is close to the values obtained from the bare cast iron disc.

The micrographs of FIG. 11 make it possible to characterize the anti-wear coatings according to the disclosure. As is evident, by virtue of the HVOF spraying technology, the particles of chromium carbide (disc A) or of FeNiCrMoSiC (disc B) included within the metallic matrices ensure good homogeneity and render the coating free of porosity.

Figure 12:
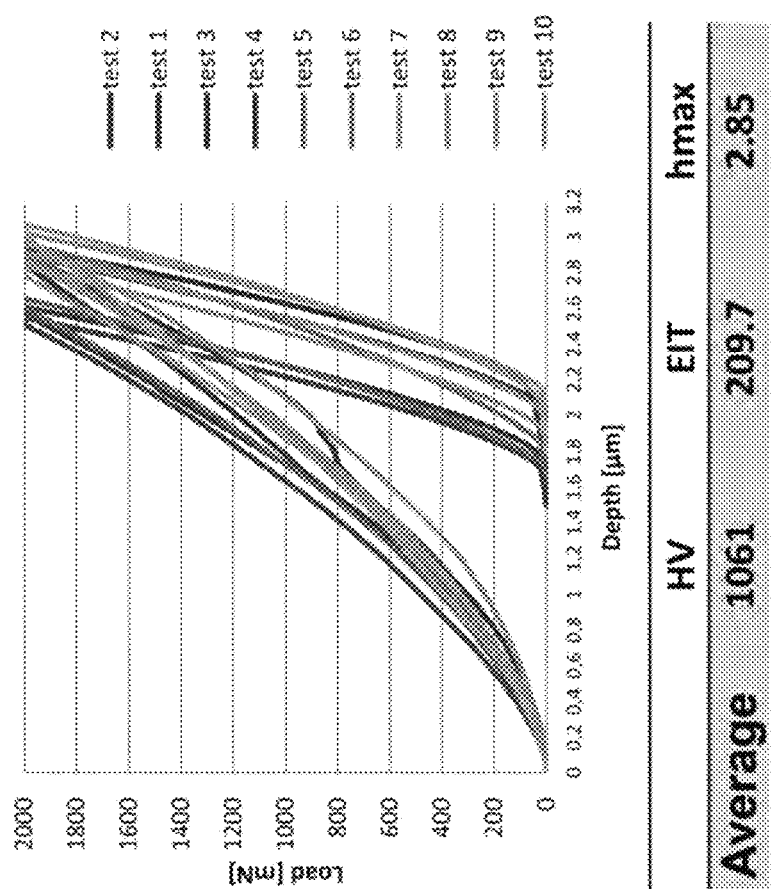
FIGS. 12, 13 and 14 indicate the characterization of the coatings implemented by means of the microhardness measurement technique using a nanoindenter, and highlighting a difference in hardness between the WC coating currently on the market and used for comparative purposes, with the hardnesses of the single layer coating of the present disclosure including particles of chromium carbide ($Cr_3C_2$) dispersed within a metallic matrix of an alloy of NiCr (disc A, FIG. 13), or several metallic materials in order to create a metallic matrix constituted by a chromium-nickel austenitic steel and can be composed of an alloy of FeNiCrMoSiC (iron-nickel-chromium-molybdenum-silicon-carbon), e.g. that one known by the trade name Diamalloy® (disc B—FIG. 14)
Figure 13:
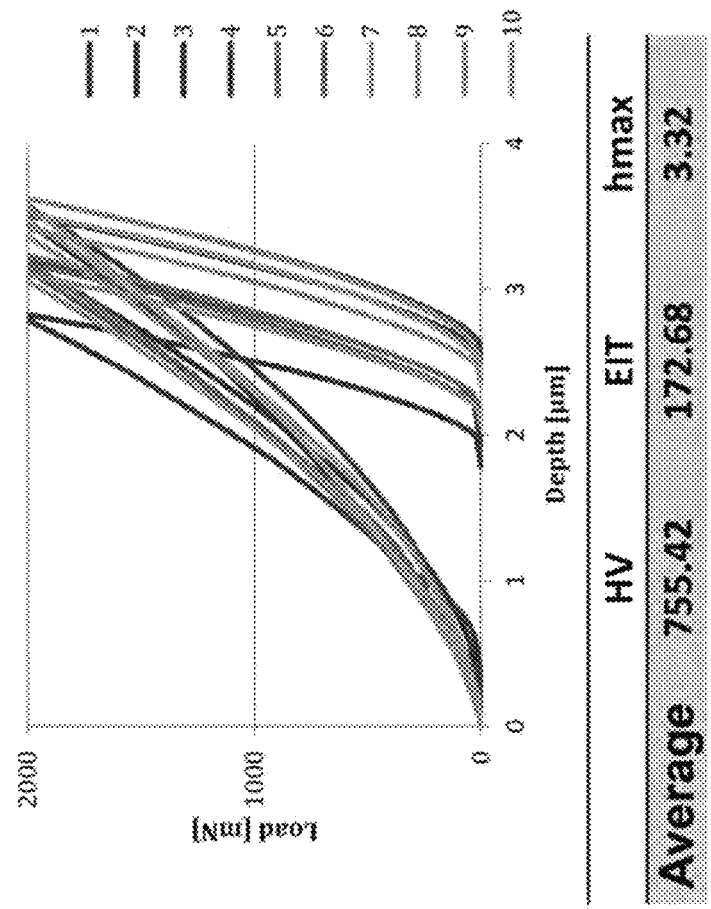
Figure 14:
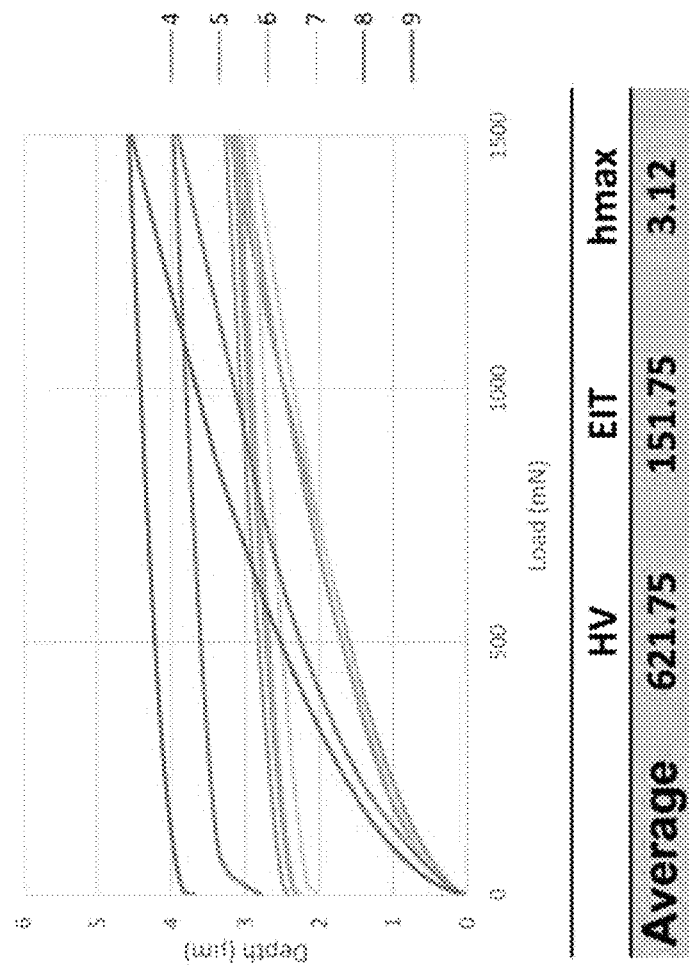
Figure 15A:
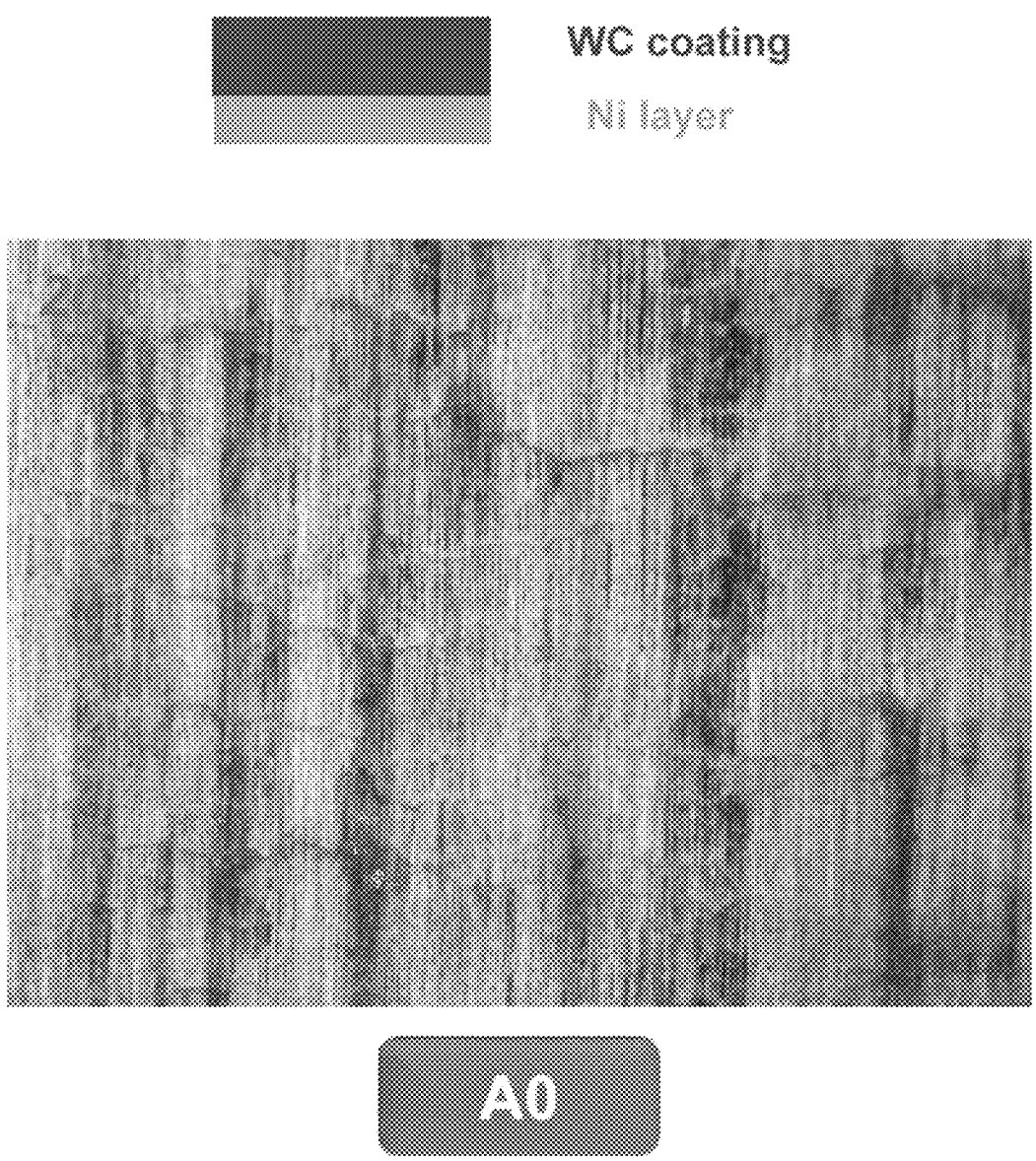
FIG. 15 shows the comparison of the state of the surface after testing, of the coating based upon WC deposited on a bed of nickel, currently on the market and used for comparative purposes—Disc A0, with the state of the surface after the testing of the coatings of the present disclosure (discs A and B)
Figure 15B:
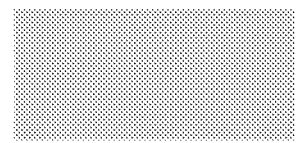
Figure 15B:
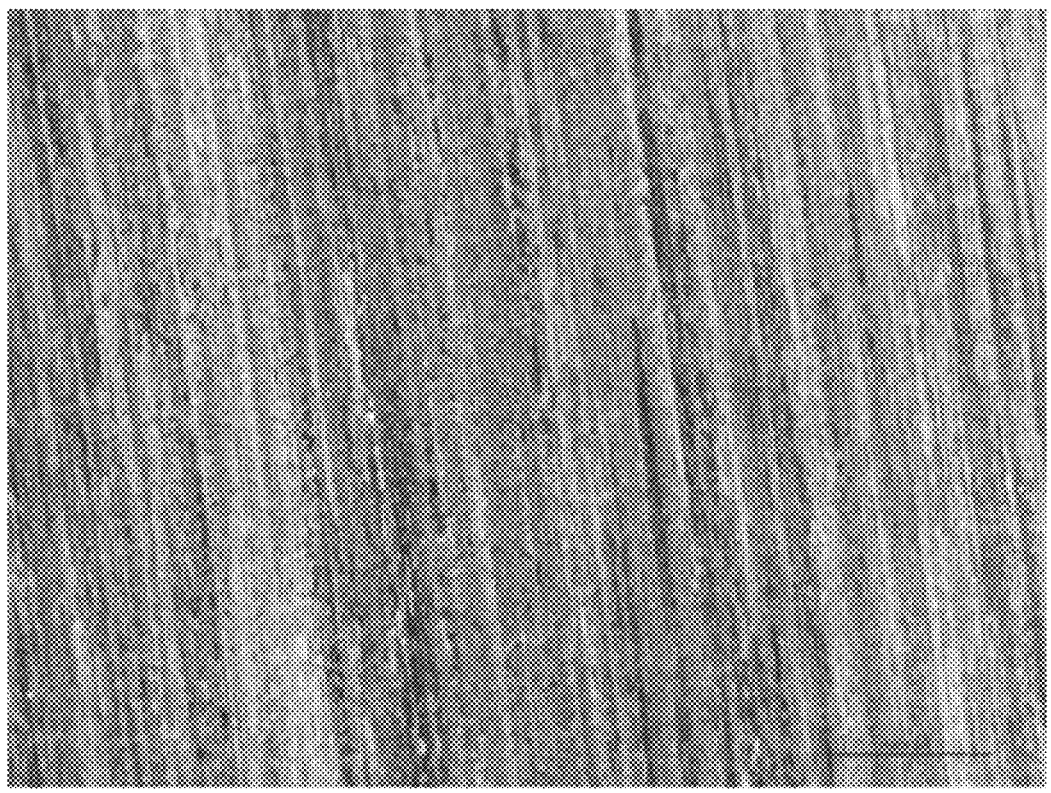
Figure 15B:
Figure 15C:
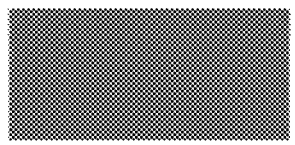
Figure 15C:
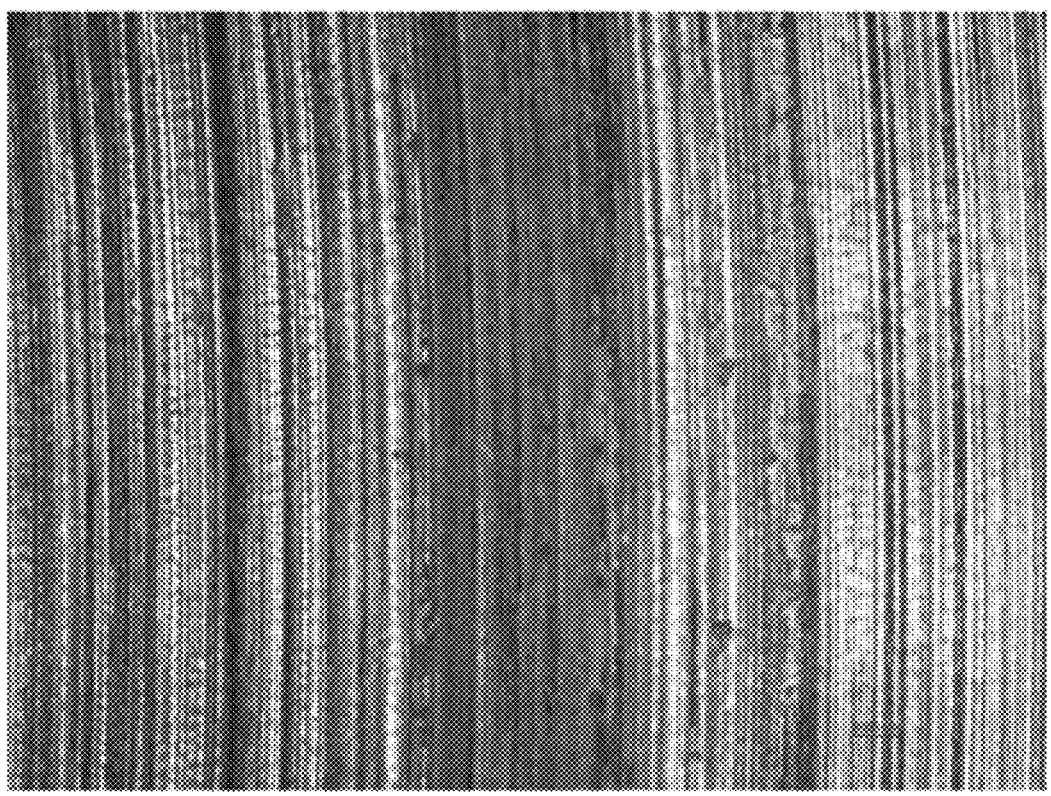
Figure 15C:
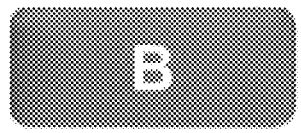

The micrographs of FIG. 15 highlight the state of the braking surface covered respectively with the coatings in WC (A0), in $Cr_3C_2$ (A) and in austenitic alloy like Diamalloy® (B), subjected to the Fading test. The two coatings, show a reduced tendency to create surface cracks, compared to the coating in WC used for comparative purposes. The lower tendency to generate cracks is explained by FIGS. 12-13-14, wherein the value of the elastic modulus (EIT) of the coating in WC is higher than that of the coating in $Cr_3C_2$ and that of Diamalloy® type.

Corrosion

Figure 16A:
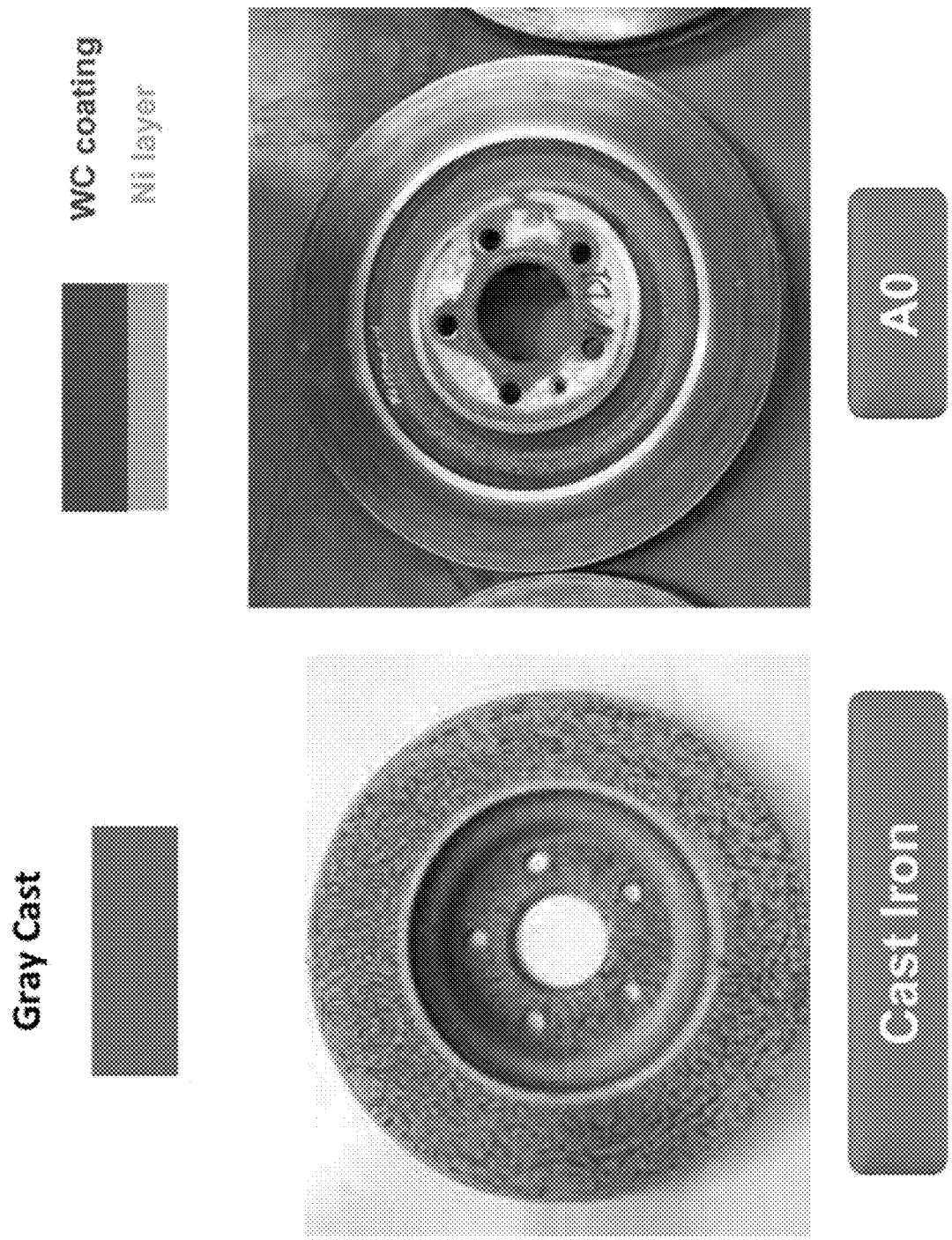
FIG. 16 shows the comparison of the surface aspect of the braking surfaces of the discs after the resistance to corrosion test, discs which are respectively composed of bare cast iron (Cast Iron), covered with the commercial coating based upon WC deposited on a bed of Ni for comparison (disc A0), covered with particles of chromium carbide ($Cr_3C_2$) dispersed within a metallic matrix of an alloy of NiCr (disc A), and finally coated with several metallic materials in order to create a metallic matrix constituted by a chromium-nickel austenitic steel and can be composed of an alloy of FeNiCrMoSiC (iron-nickel-chromium-molybdenum-silicon-carbon), e.g. that one known by the trade name Diamalloy® (disc B); the respective photographs showing how the coatings of hereby disclosed have a resistance to corrosion that is superior to that provided by simple bare cast iron, and comparable to that provided by the commercial coating based upon WC.
Figure 16B:
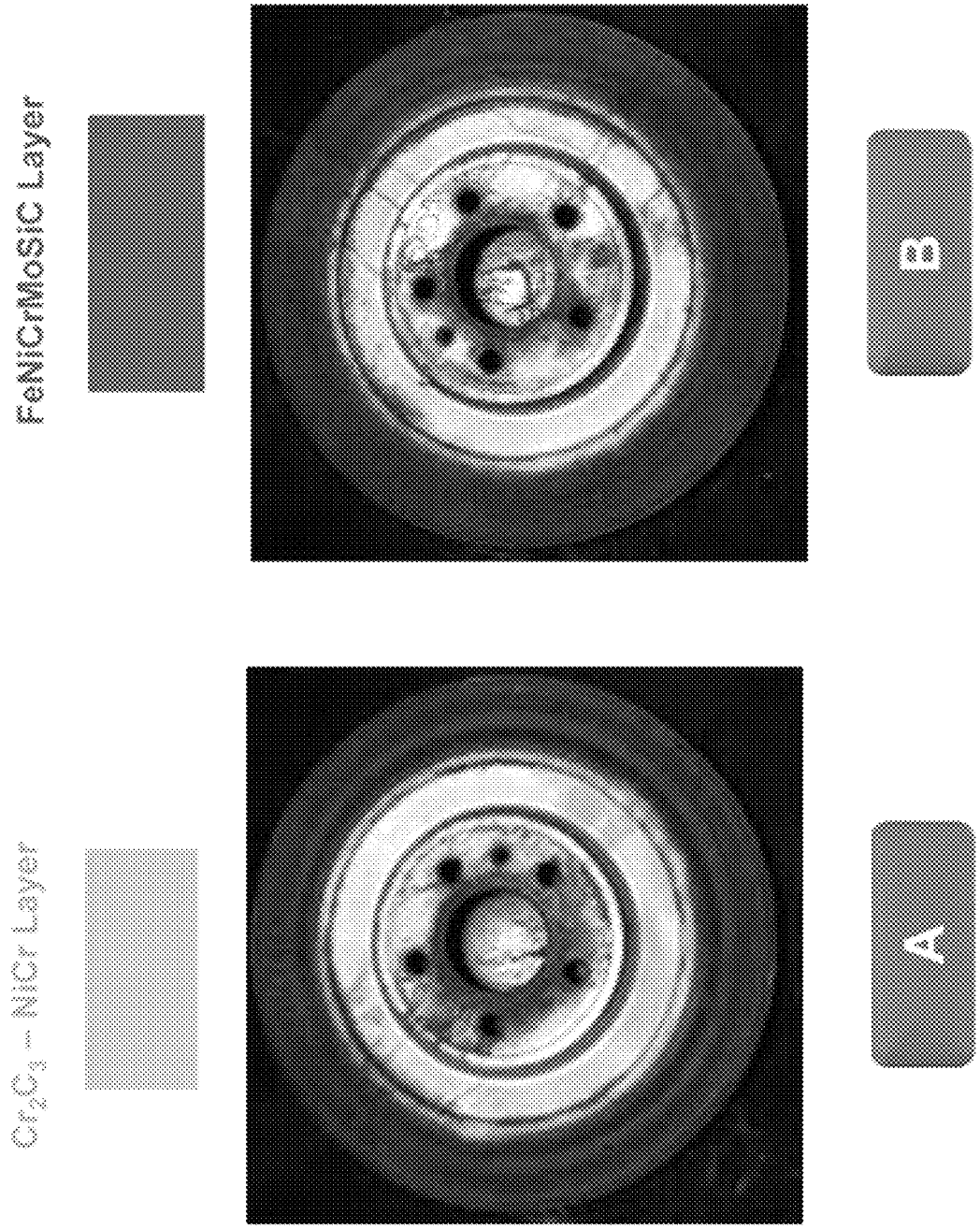
Figure 17:
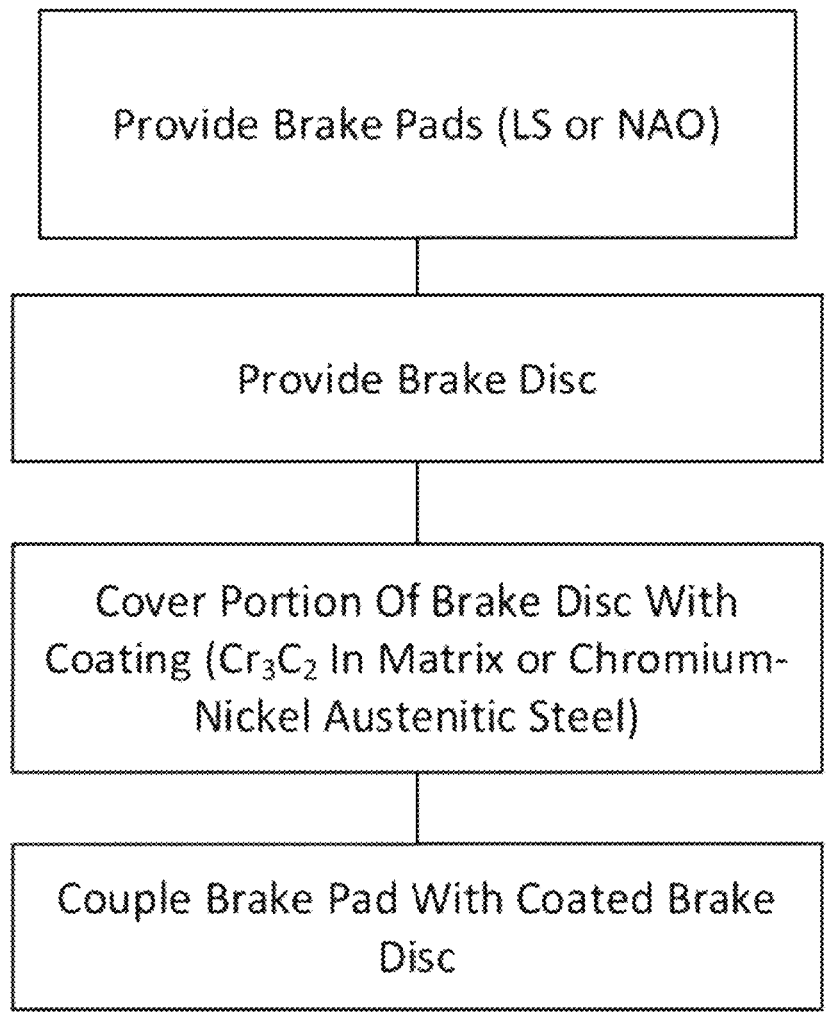
FIG. 17 shows an embodiment of a method of preparing a brake pad and brake disc system having an embodiment of a coating as discussed herein, embodiments of brake pads are prepared and embodiments of brake discs are prepared. The discs are then at least partially coated with one or more of the coatings of the present disclosure. Once coated, the brake pad and coated brake discs can be coupled together.

A resistance to corrosion test was performed in order to evaluate the improvement compared to bare cast iron. The different discs chosen are as follows:

i) Gray bare cast iron
ii) Disc A0: coating in WC, for comparison
iii) Disc A: coating in $Cr_3C_2$
iv) Disc B: coating in Diamalloy The discs were first subjected to a Fading test as previously described. After the test bench test, the discs were entered into a saline chamber with a cycle consisting in: 20% of the time under a salt spray of 5% NaCl, 10% of the time drying and the remaining 70% of the time in the presence of moisture at least 90%. The discs were left for 1 week, a visual inspection was subsequently performed. The gray bare cast iron disc presented an enormous amount of rust on the braking surface, conversely the other three with different types of coating revealed a clean surface. This thus demonstrates the good resistance to corrosion, as amply described in FIG. 16.

Conclusions

Both types of coatings based upon the anti-wear material according to the disclosure tested on the same brake discs make it possible not only to substantially reduce the wear of the brake disc (expected behavior in a certain sense), but above all they make it possible, on the hand, to surprisingly also reduce the wear of the brake pads for both of the families of the friction material tested (arguably, therefore, for any family of friction material compositions currently in use, having regard to the overall composition of the friction materials tested) and, on the other hand, they make it possible at the same time and quite surprisingly to obtain good consistency in the friction coefficient.

Finally, surprisingly still, some anti-wear materials and, above all, some specific pairs of anti-wear/friction material couplings, provide significantly superior performance.

From the foregoing description, it will be appreciated that inventive coatings for brake discs and methods for reducing wear are disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount. If the stated amount is 0 (e.g., none, having no), the above recited ranges can be specific ranges, and not within a particular % of the value. For example, within less than or equal to 10 wt./vol. % of, within less than or equal to 5 wt./vol. % of, within less than or equal to 1 wt./vol. % of, within less than or equal to 0.1 wt./vol. % of, and within less than or equal to 0.01 wt./vol. % of the stated amount.

All ranges shown include the upper and lower limits of the intervals unless explicitly excluded.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

The invention claimed is:

1. An anti-wear and anti-corrosion coating for a brake disc comprising:
    a single layer of a material comprising a metallic matrix constituted by a chromium-nickel austenitic steel and composed of an alloy of FeNiCrMoSiC (iron-nickel-chromium-molybdenum-silicon-carbon), wherein
        the anti-wear and anti-corrosion coating is applicable to at least one friction surface of the brake disc configured to cooperate in use with a braking element,
        the anti-wear and anti-corrosion coating is adapted to be applied by means of thermal spray, and
        the anti-wear and anti-corrosion coating has a plasticity such as to have a reduced propensity to form microcracks under conditions of tribo-mechanical stress.

2. The anti-wear and anti-corrosion coating according to claim 1, wherein the particles of chromium carbide or the austenitic steel alloy of composition FeNiCrMoSiC still in form of metallic particle of the single alloy components are applied by thermal spray by means of High Velocity Oxygen Fuel(HVOF) technology.

3. The anti-wear and anti-corrosion coating according to claim 1, wherein the anti-wear and anti-corrosion coating has a thickness between 20 and 400 micrometers.

4. The anti-wear and anti-corrosion coating according to claim 1, wherein the anti-wear and anti-corrosion coating has, after thermal spray coating and grinding, a surface roughness between 0.05 and 2 micrometers.

5. A vehicle brake system comprising:
an element to be braked, the element to be braked comprising a brake disc or a drum made from cast iron or steel; and
at least one braking element comprising a brake shoe or a pad, suitable for cooperating by friction with the element to be braked, the element to be braked having at least one friction surface configured to cooperate with the at least one braking element and the at least one friction surface covered with an anti-wear and anti-corrosion coating, wherein the anti-wear and anti-corrosion coating:
comprises a single layer of a material comprising a metallic matrix constituted by a chromium-nickel austenitic steel and composed of an alloy of FeNiCrMoSiC (iron-nickel-chromium-molybdenum-silicon- carbon);
is applicable to at least one friction surface of the brake disc configured to cooperate in use with a braking element;
is adapted to be applied by means of thermal spray; and
has a plasticity such as to have a reduced propensity to form micro-cracks under conditions of tribo-mechanical stress.

6. The vehicle brake system according to claim 5, wherein the braking element comprises at least one friction material block configured to cooperate with the element to be braked, the friction material being of the LS (Low Steel) or NAO (Non Asbestos Organics) type.

7. The vehicle brake system according to claim 5, wherein the particles of chromium carbide or the austenitic steel alloy of composition FeNiCrMoSiC still in form of metallic particle of the single alloy components are applied by thermal spray by means of High Velocity Oxygen Fuel (HVOF) technology.

8. The vehicle brake system according to claim 5, wherein the anti-wear and anti-corrosion coating has a thickness between 20 and 400 micrometers.

9. The vehicle brake system according to claim 5, wherein the anti-wear and anti-corrosion coating has, after thermal spray coating and grinding, a surface roughness between 0.05 and 2 micrometers.

10. A method for the simultaneous reduction in wear of a brake disc and associated brake pads, the method comprising:
preparing one or more brake pads using an LS (Low Steel) or NAO (Non Asbestos Organics) type friction material formulation;
covering at least one friction surface of a brake disc intended to cooperate in use with the one or more brake pads with an anti-wear and anti-corrosion coating with plasticity such as to have a reduced propensity to form micro-cracks under conditions of tribo-mechanical stress, wherein the anti-wear and anti-corrosion coating comprises an alloy of FeNiCrMoSiC (iron- nickel-chromium-molybdenum-silicon-carbon); and
coupling together the prepared one or more brake pads and the brake disc.

11. The method according to claim 10, wherein the anti-wear and anti-corrosion coating is applied by means of the HVOF (High Velocity Oxygen Fuel) thermal spray technology.

12. The method according to claim 10, wherein the one or more brake pads, made with a friction material belonging to the copper-free family, are coupled together with an anti-wear and anti-corrosion coating coated on at least one friction surface of the brake disc comprising particles of chromium carbide (Cr3C2) dispersed within a metallic matrix made of an alloy of NiCr or of a chromium-nickel austenitic steel.

13. The method according to claim 10, wherein the particles are obtained from a combination of metallic materials in order to create a compound constituted by an alloy of FeNiCrMoSiC (iron-nickel-chromium-molybdenum-silicon-carbon).

* * * * *